(12) United States Patent
Duderstadt

(10) Patent No.: US 9,022,445 B1
(45) Date of Patent: May 5, 2015

(54) TELESCOPING GRAB HANDLE FOR PICKUP TRUCKS AND THE LIKE

(71) Applicant: James Louis Duderstadt, San Antonio, TX (US)

(72) Inventor: James Louis Duderstadt, San Antonio, TX (US)

( * ) Notice: Subject to any disclaimer, the term of this patent is extended or adjusted under 35 U.S.C. 154(b) by 0 days.

(21) Appl. No.: 14/184,596

(22) Filed: Feb. 19, 2014

Related U.S. Application Data

(63) Continuation-in-part of application No. 13/608,805, filed on Sep. 10, 2012, now Pat. No. 8,678,457.

(60) Provisional application No. 61/533,235, filed on Sep. 11, 2011, provisional application No. 61/766,671, filed on Feb. 19, 2013, provisional application No. 61/878,041, filed on Sep. 16, 2013.

(51) Int. Cl.
*B60N 3/02* (2006.01)

(52) U.S. Cl.
CPC ........................ *B60N 3/023* (2013.01)

(58) Field of Classification Search
CPC ........................................ B60N 3/023
USPC .................. 296/1.02, 57.1, 183.1; 16/429
See application file for complete search history.

(56) References Cited

U.S. PATENT DOCUMENTS

| | | |
|---|---|---|
| 1,099,924 A | 6/1914 | Johnson |
| 1,691,639 A | 11/1928 | Charlebois et al. |
| 3,858,905 A | 1/1975 | Peebles |
| 4,074,379 A * | 2/1978 | Grossman et al. ............ 114/362 |
| 5,028,063 A | 7/1991 | Andrews |
| 5,046,582 A | 9/1991 | Albrecht |
| 5,205,603 A | 4/1993 | Burdette, Jr. |
| 5,687,813 A | 11/1997 | Bensch |
| 6,003,633 A | 12/1999 | Rolson |
| 6,116,378 A | 9/2000 | Barrow |
| 6,425,572 B1 | 7/2002 | Lehr |
| 6,578,666 B1 | 6/2003 | Miller |
| 6,640,929 B2 | 11/2003 | Korpi |
| 6,643,897 B2 | 11/2003 | Chang |
| 6,715,813 B2 | 4/2004 | Thompson et al. |
| 6,739,639 B1 | 5/2004 | Chumley et al. |
| 6,942,271 B1 | 9/2005 | Jamison et al. |
| 6,964,444 B2 | 11/2005 | Chumley et al. |
| 6,994,362 B2 | 2/2006 | Foster |
| 7,025,174 B1 | 4/2006 | Hawley |
| 7,055,838 B2 | 6/2006 | Lambie |
| 7,080,713 B1 | 7/2006 | Riggs |
| 7,090,276 B1 | 8/2006 | Bruford et al. |
| 7,111,858 B2 | 9/2006 | Manser et al. |
| 7,229,116 B1 | 6/2007 | Bruford et al. |
| 7,240,947 B2 | 7/2007 | Kuznarik et al. |

(Continued)

*Primary Examiner* — Jason S Morrow
(74) *Attorney, Agent, or Firm* — Kammer Browning PLLC

(57) ABSTRACT

A telescoping grab handle mounted on the side wall of the cargo box, adjacent the tailgate, in a pickup truck. The device has only one moving part which allows the telescoping grab handle to be easily raised vertically and locked into the extended position or easily lowered to the retracted or stowed position while standing on the ground outside the cargo box. The telescoping grab handle mounted on the side wall of the cargo box also overcomes many disadvantages of tailgate mounted grab handles which interfere with cargo handling and are rendered inoperable if the tailgate is damaged. The telescoping grab handle mounted on the side wall of the cargo box may be added as an aftermarket accessory, but the internal components of the device could also be incorporated directly into the side wall of the cargo box by the auto manufacturer during initial manufacture of the vehicle.

18 Claims, 19 Drawing Sheets

(56) References Cited

U.S. PATENT DOCUMENTS

| | | |
|---|---|---|
| 7,347,473 B2 | 3/2008 | Miller et al. |
| 7,401,798 B2 | 7/2008 | Dolan |
| 7,438,304 B2 | 10/2008 | Segall |
| 7,441,820 B1 | 10/2008 | Alvarado |
| D585,350 S | 1/2009 | Coletti |
| 7,472,938 B2 | 1/2009 | Firzlaff et al. |
| 7,488,021 B1 | 2/2009 | Roos et al. |
| 7,516,997 B2 | 4/2009 | Kuznarik et al. |
| 7,530,619 B1 | 5/2009 | Bruford et al. |
| 7,617,571 B2 | 11/2009 | Lee et al. |
| 7,673,922 B1 | 3/2010 | Grimes |
| 7,712,811 B2 | 5/2010 | Heaman et al. |
| 7,744,141 B2 | 6/2010 | Saionji et al. |
| 7,954,836 B2 | 6/2011 | Mann |
| 8,075,008 B1 | 12/2011 | Hanser et al. |
| 8,182,013 B1 | 5/2012 | Alvarado |
| 8,251,423 B1 | 8/2012 | Lingle |
| 8,393,657 B1 | 3/2013 | Duderstadt |
| 8,794,660 B1 * | 8/2014 | Stover et al. .................. 280/727 |
| 2003/0201656 A1 | 10/2003 | Ferguson et al. |
| 2007/0096422 A1 | 5/2007 | Dolan |
| 2009/0322052 A1 | 12/2009 | Ruehl |
| 2010/0230209 A1 | 9/2010 | Hughes et al. |
| 2011/0168491 A1 | 7/2011 | Cheatham, Jr. |
| 2012/0104721 A1 | 5/2012 | Genest et al. |

\* cited by examiner

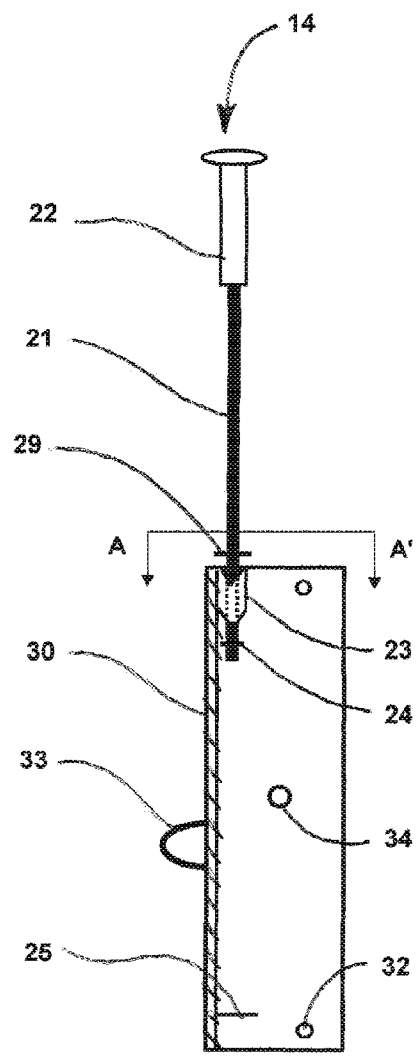
Fig. 5
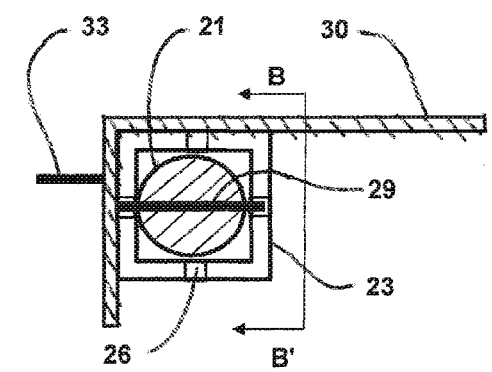
Fig. 6 (View A-A')
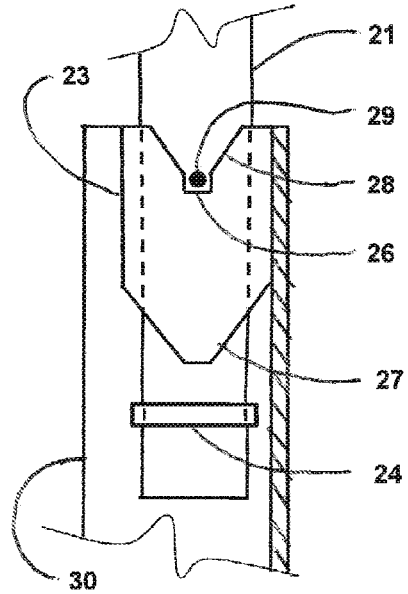
Fig. 7 (View B-B')

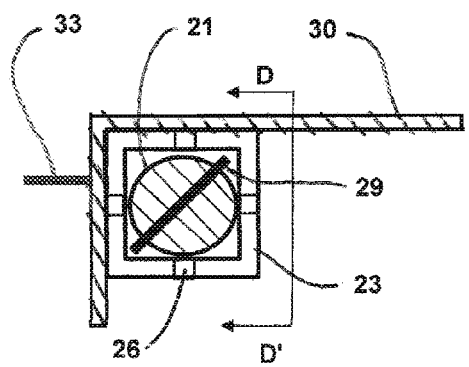
Fig. 9 (View C-C')
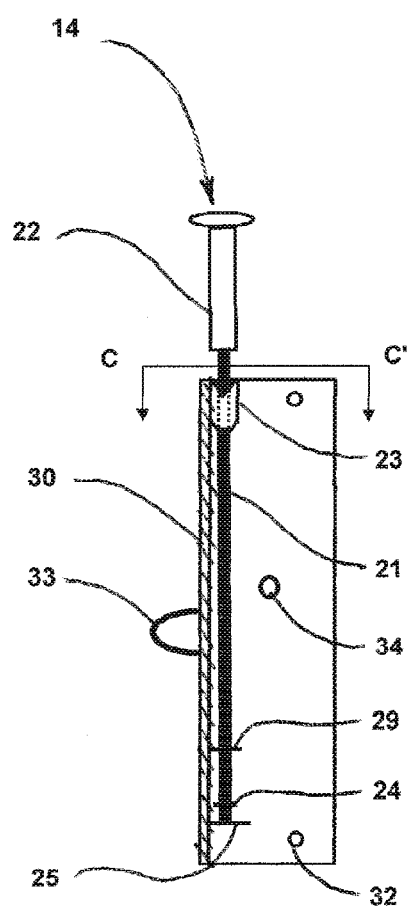
Fig. 8
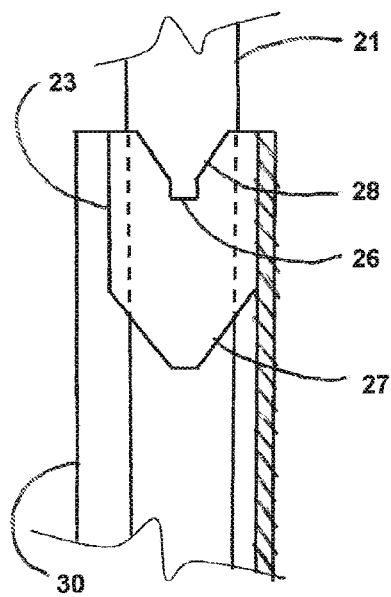
Fig. 10 (View D-D')

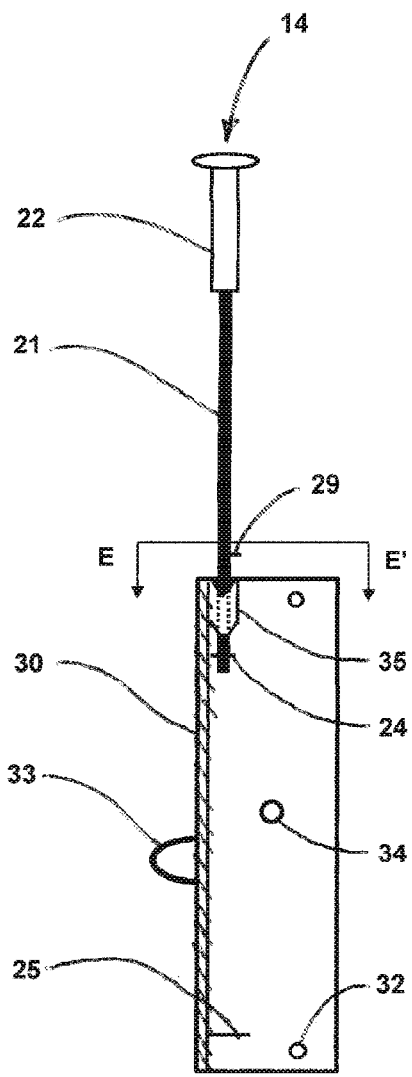
Fig. 11
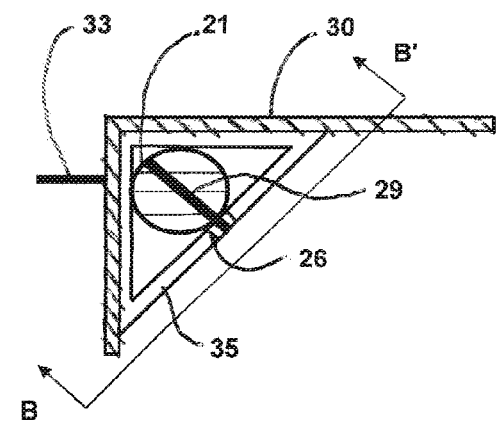
Fig. 12 (View E-E')
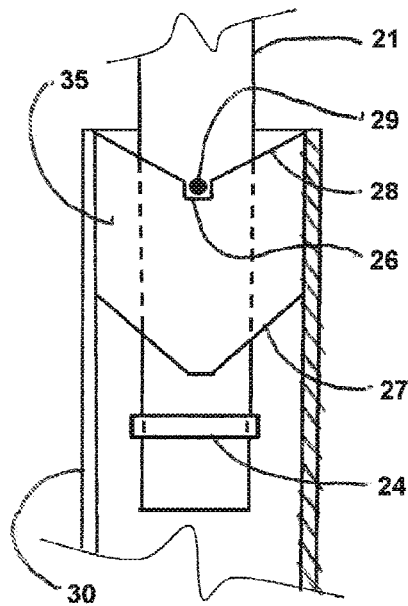
Fig. 13 (View F-F')

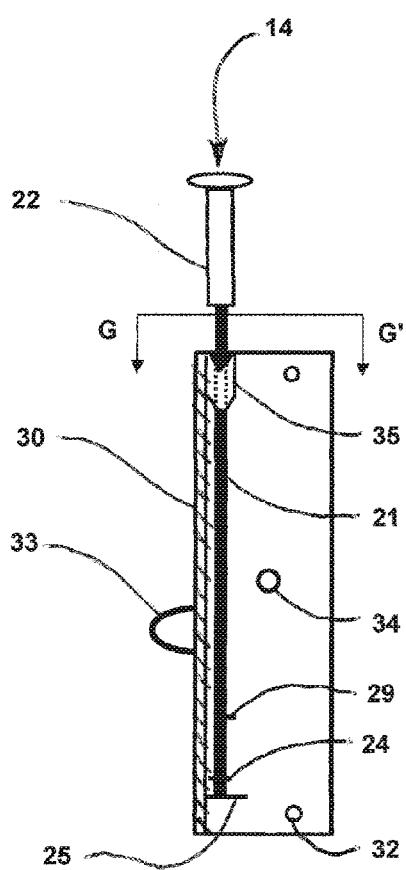
Fig. 14
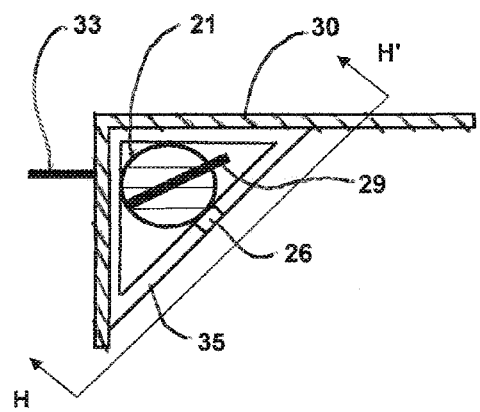
Fig. 15 (View G-G')
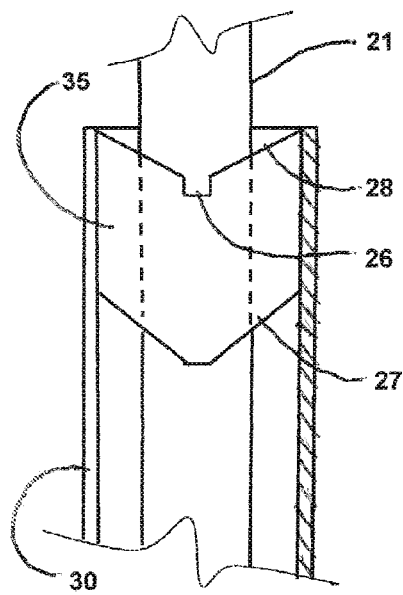
Fig. 16 (View H-H')

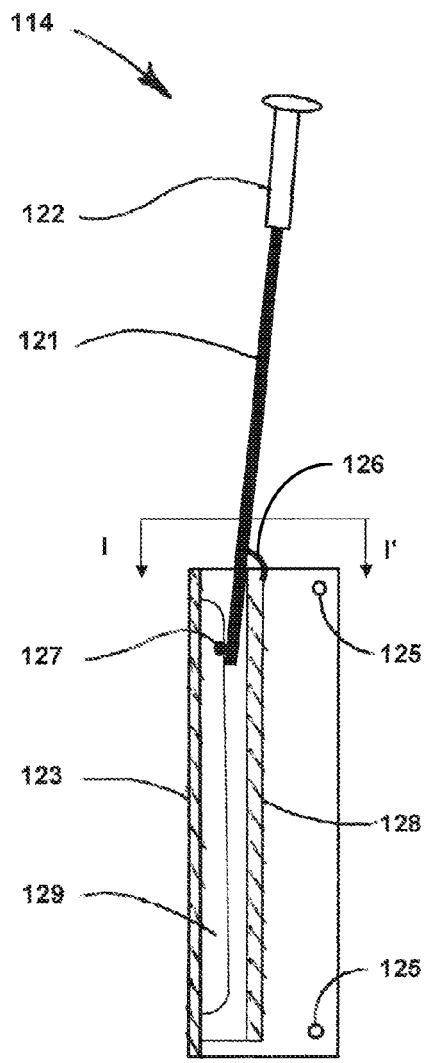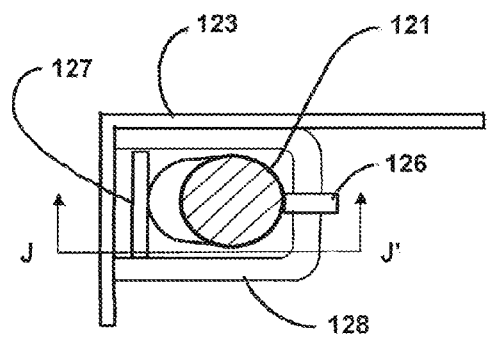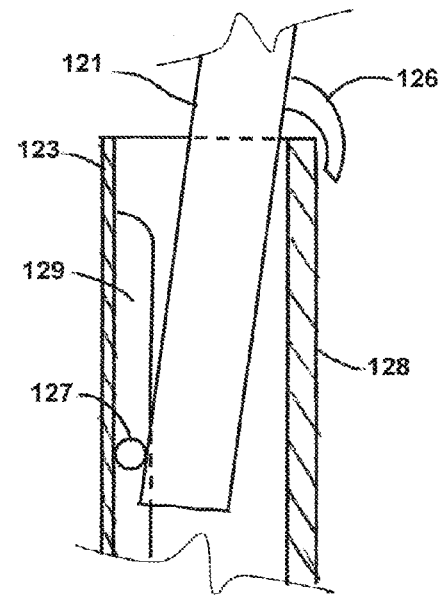
Fig. 21
Fig. 22 (View I-I')
Fig. 23 (View J-J')

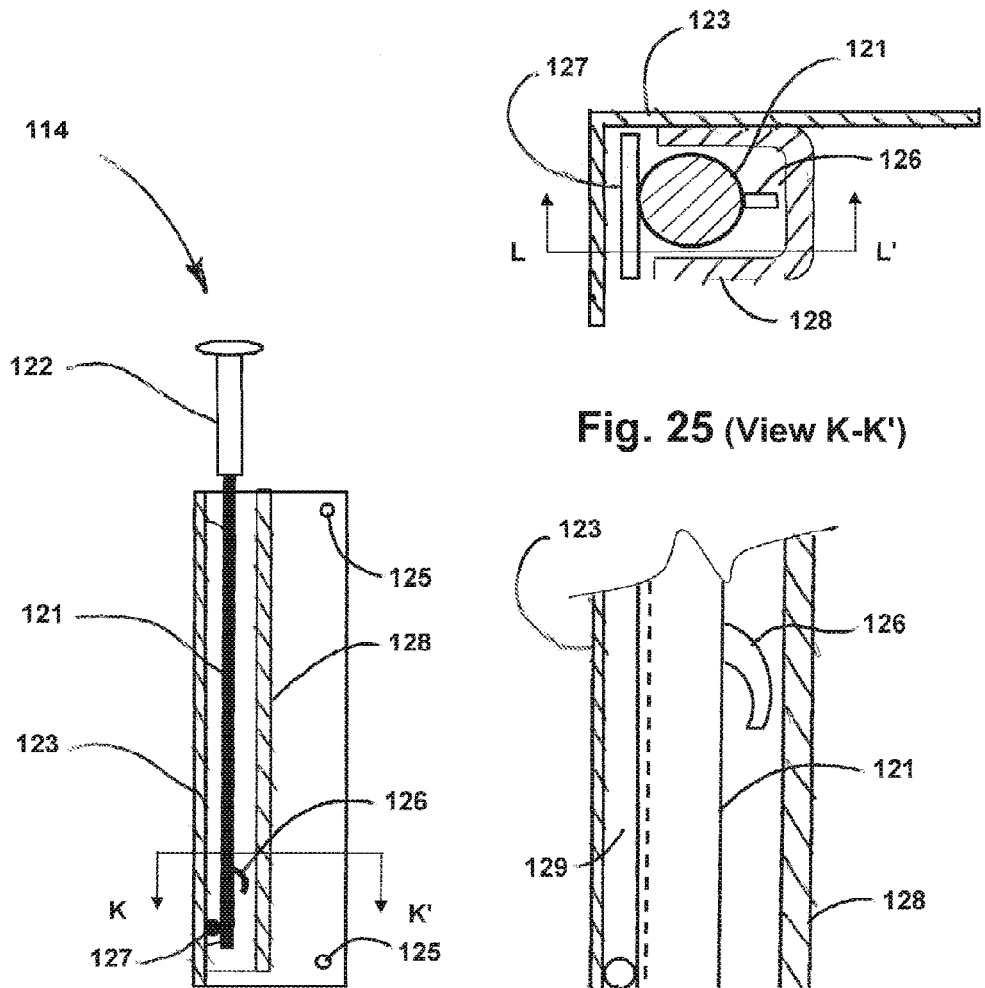
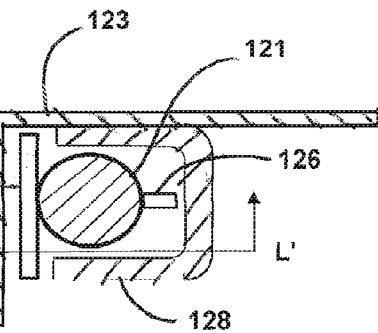
Fig. 25 (View K-K')
Fig. 24
Fig. 26 (View L-L')

Fig. 28 (View M-M')

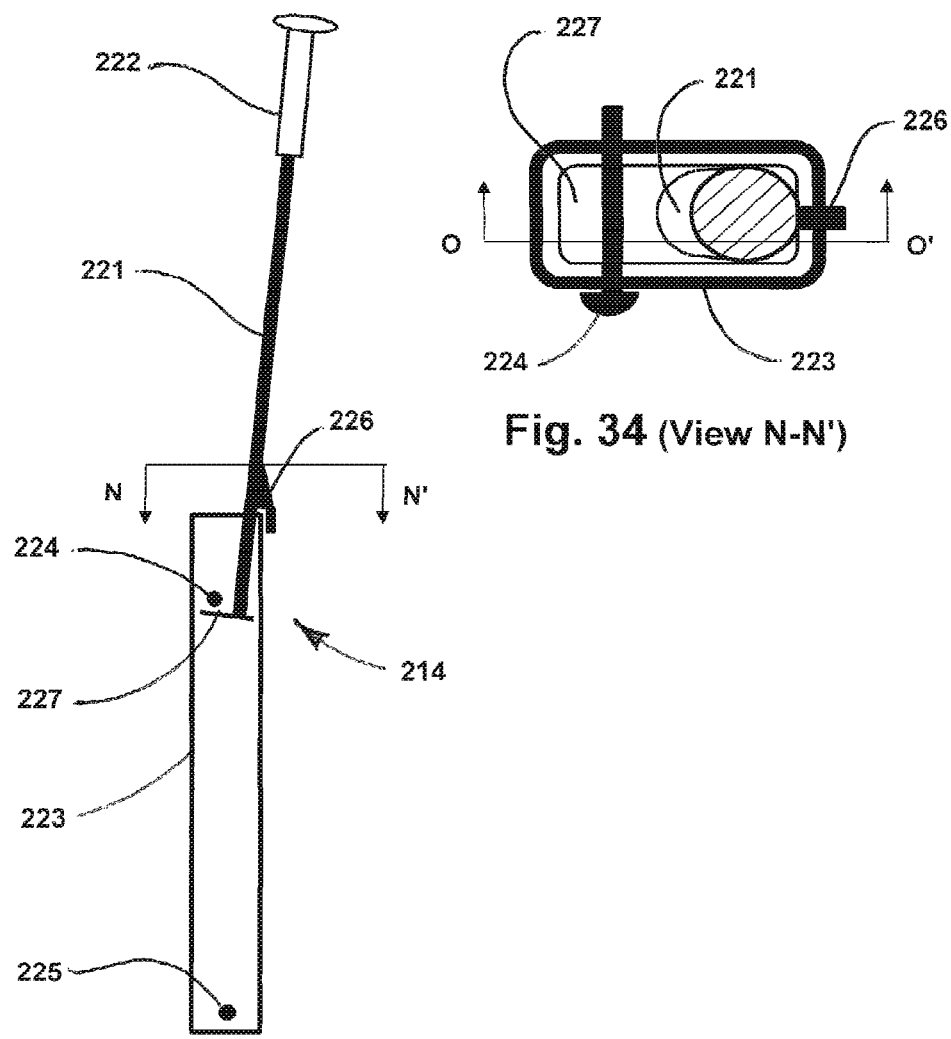
Fig. 34 (View N-N')
Fig. 33 (View O-O')

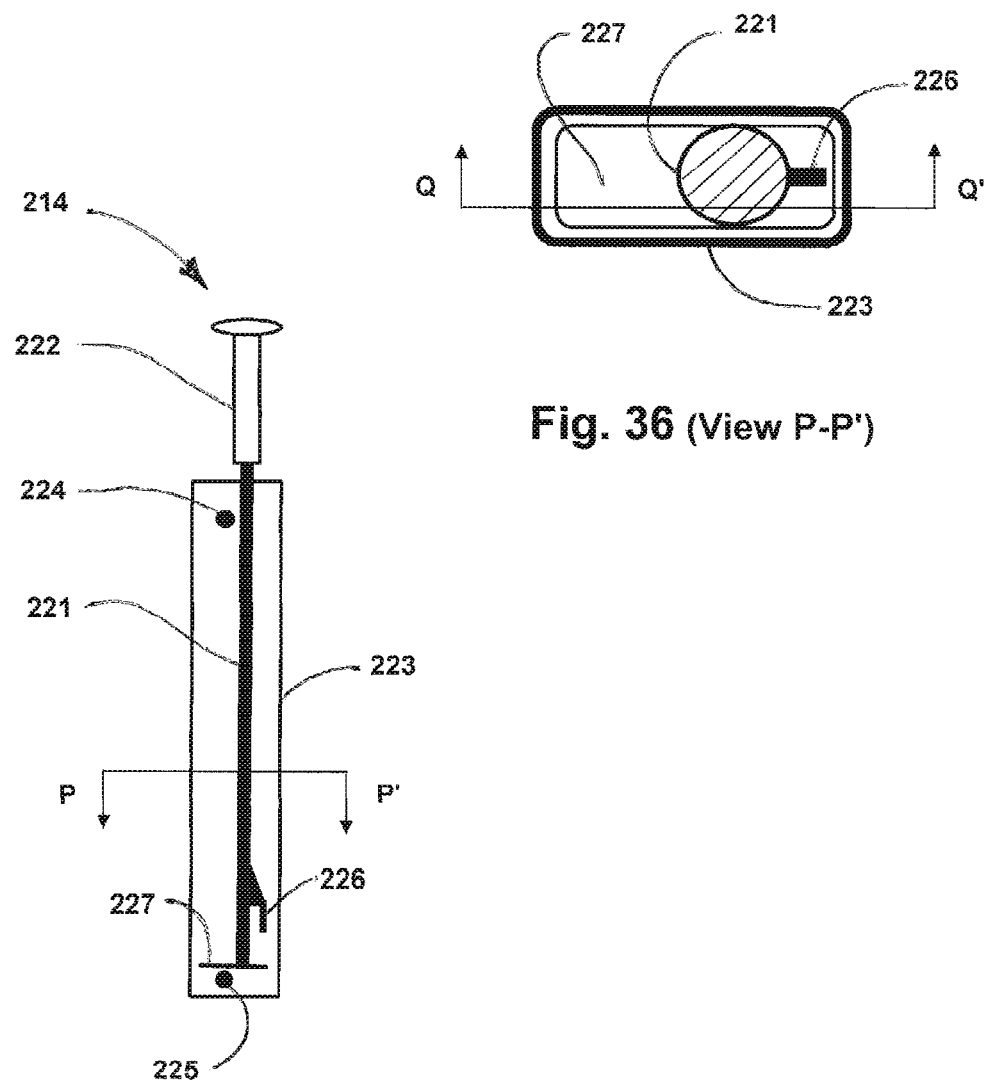
Fig. 36 (View P-P')
Fig. 35 (View Q-Q')

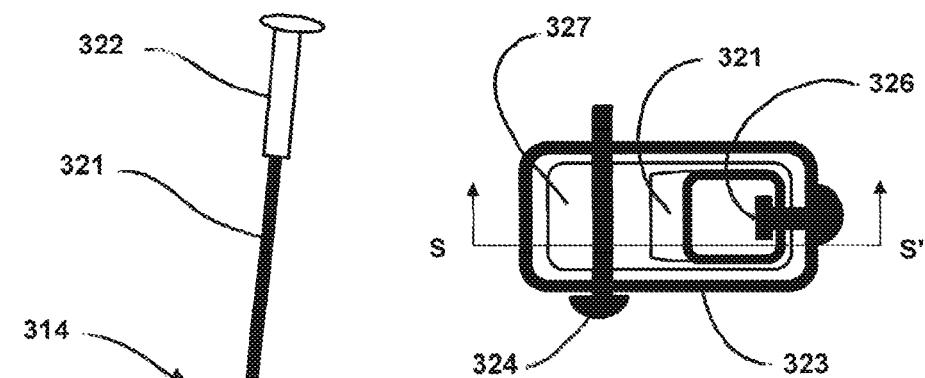
Fig. 42 (View R-R')
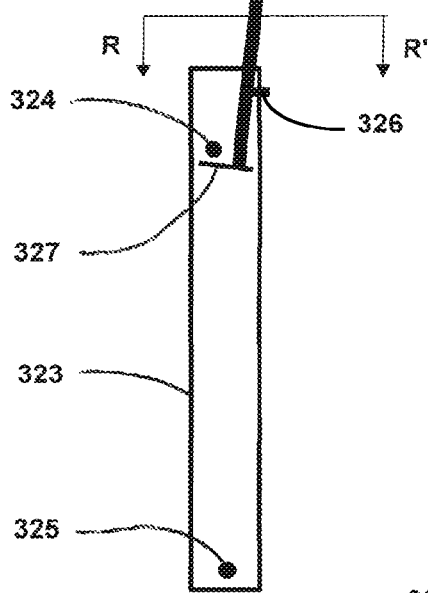
Fig. 41
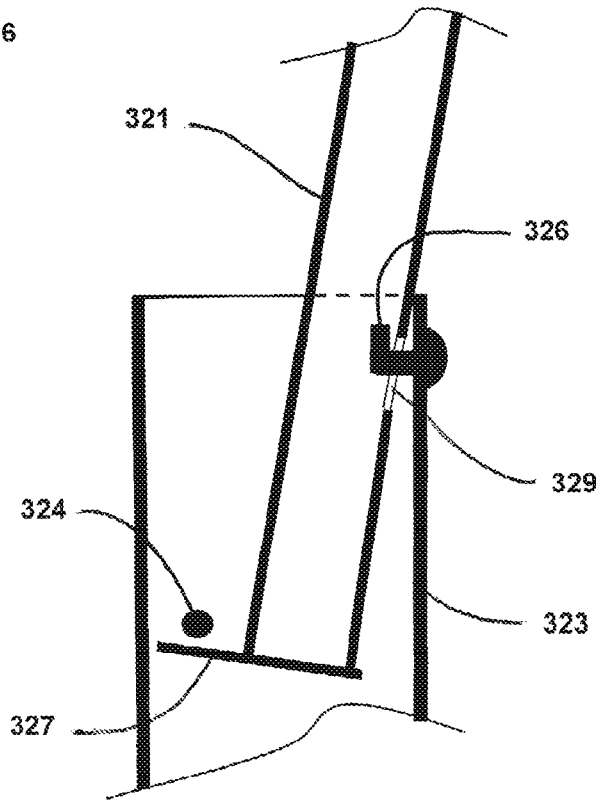
Fig. 43 (View S-S')

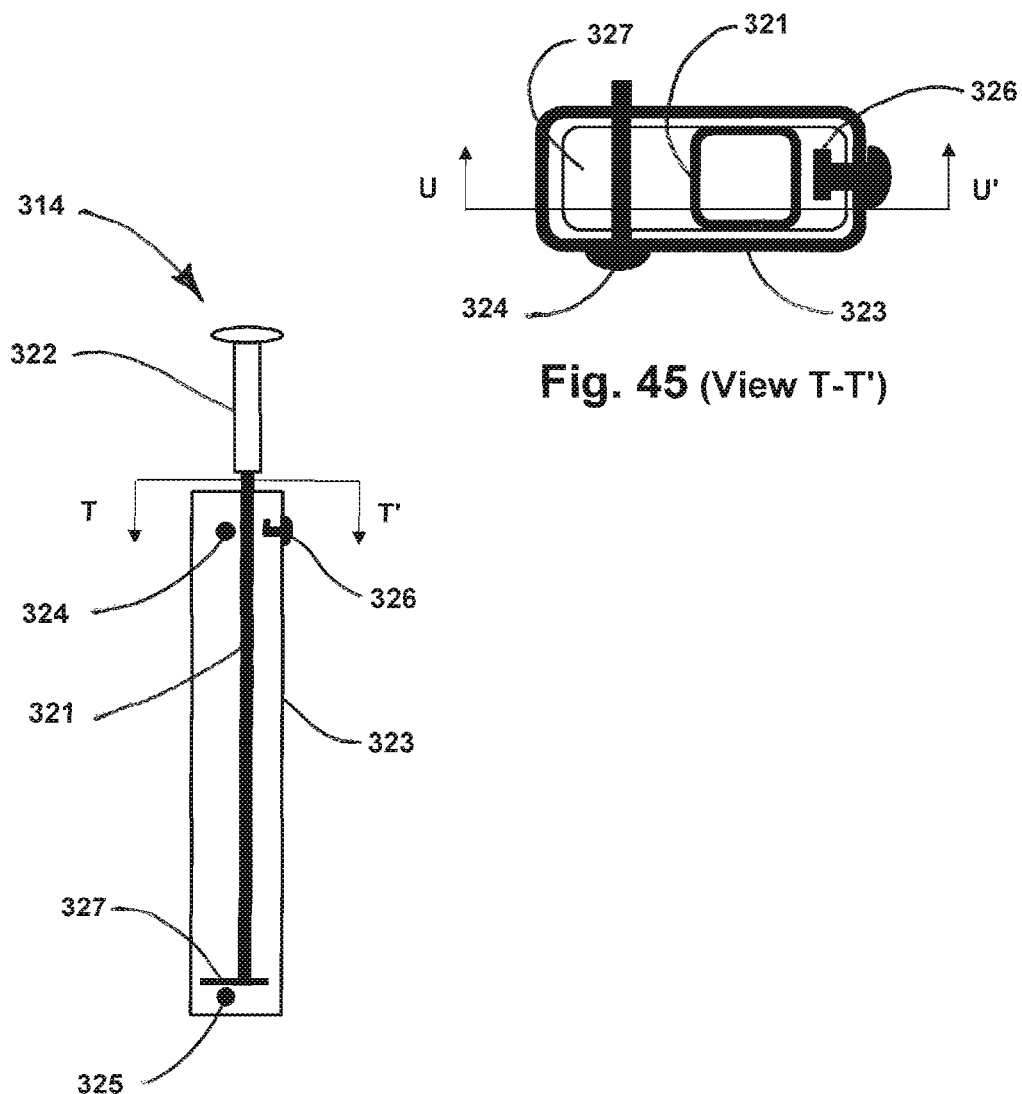
Fig. 45 (View T-T')
Fig. 44 (View U-U')

TELESCOPING GRAB HANDLE FOR PICKUP TRUCKS AND THE LIKE

CROSS REFERENCES TO RELATED APPLICATIONS

This application claims benefit under Title 35 United States Code §119(e) of U.S. Provisional Patent Application Ser. No. 61/766,671, filed Feb. 19, 2013, as well as U.S. Provisional Patent Application Ser. No. 61/878,041, filed Sep. 16, 2013; and further claims benefit under Title 35 United States Code §120 as a Continuation-In-Part of co-pending U.S. patent application Ser. No. 13/608,805, filed Sep. 10, 2012, now U.S. Pat. No. 8,678,457, issued Mar. 25, 2014; which itself further claims benefit under Title 35 United States Code §119 (e) of U.S. Provisional Patent Application Ser. No. 61/533, 235, filed Sep. 11, 2011, the full disclosures of which are each incorporated herein by reference.

BACKGROUND OF THE INVENTION

1. Field of the Invention

The present invention relates generally to systems for increasing ease of access into cargo areas present on motorized vehicles including pickup trucks in some embodiments.

2. Description of the Related Art

Various types of motorized vehicles feature a cargo area, including pickup trucks having a cargo box. The cargo box (or cargo bed as it is sometimes called) is generally comprised of a floor bounded by a front wall, two side walls and an operable tailgate in the rear. The tailgates on most pickup trucks generally open to a horizontal position to allow easy access for the loading or unloading of cargo and close to a vertical position to retain the cargo within the cargo box.

Most pickup trucks are now manufactured without exterior running boards along the sides of the cargo box. Consequently, access into and out of the cargo box is typically accomplished by stepping on top of the rear bumper or on top of the tailgate when it is open or in the horizontal position. However, recent trends in pickup truck design have raised the level of the rear bumper and the tailgate to such a height above the ground that it is now difficult to enter & exit the cargo box of most pickup trucks. This is particularly true of four wheel drive models which often have larger tires and higher ground clearance than other models.

Many schemes involving grab handles have been developed to provide enhanced stability to personnel as they enter and exit the cargo box of a pickup truck. However, most of the grab handles presented in the prior art are mounted on the tailgate and often create an obstruction when loading or unloading cargo. For example, the pivoting grab handle shown in U.S. Pat. No. 7,530,619 could not be utilized when loading or unloading standard size sheets of plywood or other large bulky objects over the tailgate, because it would create an obstruction. Furthermore, grab handles mounted on the tailgate cannot be utilized when the tailgate is closed and they are often rendered inoperable if the tailgate is damaged.

U.S. Pat. No. 7,401,798 shows a grab handle mounted to the side wall of the cargo box, but it is pivotally attached at the bottom and must be folded down onto the bed of the cargo box to be placed in the stowed position. Furthermore, this particular grab handle is connected to the tailgate by a cable which is meant to raise the grab handle as the tailgate is opened (or lowered) to the horizontal position, thereby making it difficult or impossible to open the tailgate if any cargo was laid on top or against this grab handle. Consequently, any cargo resting on top or against this particular grab handle would have to be cleared away while standing on the ground outside the cargo box, before the tailgate could be opened and the grab handle could be utilized to enter the cargo box.

US Patent Application Publication No. 2012/0104721 A1 shows a telescoping grab handle pivotally attached to a tailgate step. The telescoping portion thereof utilizes an internal spring pin (item 88) to lock the grab handle in the extended position. Such spring pins are well know in the art and are commonly utilized to adjust the height of walking canes and crutches, but only on an occasional basis to suit the needs of the individual using the device. However, utilizing a spring pin device on a routine basis would be awkward and cumbersome because two free hands are usually required to adjust telescoping devices which operate with a spring pin. One hand is required to depress the spring pin, while the other hand is required to slide the telescoping member. Furthermore, this grab handle is mounted on the tailgate and would also be subject to the aforementioned disadvantages.

Thus, there is a dire need in the automotive market to provide a grab handle which will not interfere with cargo handling, yet still provide assistance and enhanced stability to personnel when entering or exiting the cargo box of a pickup truck. In addition, the grab handle must be simple to use, durable and maintenance free with a minimum of moving parts, inexpensive to manufacture and easy to install on a wide variety of pickup trucks.

SUMMARY OF THE INVENTION

It is the object of the proposed embodiment to overcome the aforementioned disadvantages by providing a telescoping grab handle which is mounted on the side wall of the cargo box, adjacent the tailgate.

Unlike grab handles mounted on the tailgate, the proposed embodiment would never interfere with the loading or the unloading of cargo because the proposed telescoping grab handle would be mounted on the side wall of the cargo box, not on the tailgate.

In addition, the proposed embodiment would not interfere with stowed cargo because the proposed grab handle would telescope up or down vertically and thereby occupy a very small area within the cargo box, unlike a pivoting grab handle which folds up or down and would thereby require a large cleared area in the cargo box (at least as long as the grab handle) in order to remain operable.

The telescoping action of the proposed embodiment has only one moving part which allows the grab handle to be easily extended or retracted with only one hand, unlike telescoping grab handles which have a spring pin and therefore two moving parts (the spring pin and the telescoping member) which require two hands to extend or retract the grab handle.

Unlike grab handles which are mounted on the tailgate and can only be used when the tailgate is open (or in the horizontal position), the proposed telescoping grab handle is mounted on the side wall of the cargo box and can be utilized when entering or exiting the cargo box regardless of whether the tailgate is open or closed.

The proposed embodiment for a telescoping grab handle mounted on the side wall would also remain operable even if the tailgate was damaged or completely removed.

For the aforementioned reasons, the chosen location for a grab handle placed within the cargo box of a pickup truck and the type of action utilized for extending or retracting the grab handle is critically important to its successful use and operation.

The preferred embodiment described herein for a telescoping grab handle mounted on the side wall of the cargo box would most likely be added after initial manufacture of the pickup truck as an aftermarket accessory, however another embodiment of the invention might also be incorporated directly into the side wall of the pickup truck by the auto manufacturer during initial manufacture of the vehicle.

The main components of the preferred embodiment for a telescoping grab handle mounted on the side wall of the cargo box of a pickup truck are briefly described below. The only moving component of the preferred embodiment is an elongated round bar (or elongated round tube) which is sized so that it will rotate and slide within a square tube. The square tube is attached to a mounting bracket and the axis is oriented vertically when attached to the side wall of the cargo box, thus the square tube will hold the elongated round bar in a vertical upright position, yet will also allow the elongated round bar to rotate and slide up or down vertically.

A small bar herein called the "lock pin" is placed perpendicularly thru the elongated round bar and is permanently fixed into the elongated round bar so that it slightly protrudes on each side. The length of the lock pin is sized so that it will fit diagonally within the square tube, thus the lock pin will support the elongated round bar in the extended or raised position when the lock pin is resting on the side walls of the square tube, yet will allow the elongated round bar to slide down thru the square tube to the retracted or lowered position when the lock pin is oriented diagonally by rotating the elongated round bar.

A retaining ring is also permanently fixed to the elongated round bar to prevent the elongated round bar from being removed from the embodiment. A limit plate is also fixed to the mounting bracket to prevent the elongated round bar from striking the floor of the pickup truck when lowered to the retracted position.

The mounting bracket for the telescoping grab handle may also be utilized to support a cargo anchor for ropes, straps or cargo nets. The mounting bracket for the telescoping grab handle may also be used as a suitable mounting device for an extendable cargo cage, cargo rack or other auto accessories know in the art.

In an alternate embodiment of the telescoping grab handle the square tube mentioned above can be replaced with a triangular tube, however the lock pin would be fixed in a manner to only protrude from one side of the round bar or round tube.

BRIEF DESCRIPTION OF THE DRAWINGS

FIG. 5 is a detailed elevation or side view of the embodiment comprising the telescoping grab handle showing the internal components in the extended or raised position.

FIG. 6 is a partial cross section of the embodiment comprising the telescoping grab handle when viewed from the top showing the orientation of the lock pin in the extended position.

FIG. 7 is a partial cross section of the embodiment comprising the telescoping grab handle when viewed from the side showing the lock pin resting in a restraining notch.

FIG. 8 is a detailed elevation or side view of the embodiment comprising the telescoping grab handle showing the internal components in the retracted or lowered position.

FIG. 9 is a partial cross section of the embodiment comprising the telescoping grab handle when viewed from the top showing the orientation of the lock pin in the retracted position.

FIG. 10 is a partial cross section of the embodiment comprising the telescoping grab handle when viewed from the side showing the absence of the lock pin in the retracted position.

FIG. 11 is a detailed elevation or side view of an alternate embodiment comprising the telescoping grab handle showing the internal components in the extended or raised position.

FIG. 12 is a partial cross section of an alternate embodiment comprising the telescoping grab handle when viewed from the top showing the orientation of the lock pin in the extended position.

FIG. 13 is a partial cross section of an alternate embodiment comprising the telescoping grab handle when viewed from the side showing the lock pin resting in a restraining notch.

FIG. 14 is a detailed elevation or side view of an alternate embodiment comprising the telescoping grab handle showing the internal components in the retracted or lowered position.

FIG. 15 is a partial cross section of an alternate embodiment comprising the telescoping grab handle when viewed from the top showing the orientation of the lock pin in the retracted position.

FIG. 16 is a partial cross section of an alternate embodiment comprising the telescoping grab handle when viewed from the side showing the absence of the lock pin in the retracted position.

FIG. 21 is a partial section of another embodiment comprising a telescoping grab handle as seen from the side showing the position of the internal components in the extended (or raised) position.

FIG. 22 is a partial section of another embodiment comprising a telescoping grab handle as seen from the top, showing the position of the internal components in the extended (or raised) position.

FIG. 23 is an enlarged view of another embodiment comprising a telescoping grab handle as seen from the side showing the position of the internal components in the extended (or raised) position.

FIG. 24 is a partial section of another embodiment comprising a telescoping grab handle as seen from the side showing the position of the internal components in the retracted (or lowered) position.

FIG. 25 is a partial section of another embodiment comprising a telescoping grab handle as seen from the top, showing the position of the internal components in the retracted (or lowered) position.

FIG. 26 is an enlarged section of another embodiment comprising a telescoping grab handle as seen from the side, showing the position of the internal components in the retracted (or lowered) position.

FIG. 28 is a partial section of another embodiment comprising a telescoping grab handle as seen from the top, showing the position of the internal components in the retracted (or lowered) position.

FIG. 33 is a partial section of another embodiment comprising a telescoping grab handle as seen from the side showing the position of the internal components in the extended (or raised) position.

FIG. 34 is a partial section of another embodiment comprising a telescoping grab handle as seen from the top, showing the position of the internal components in the extended (or raised) position.

FIG. 35 is a partial section of another embodiment comprising a telescoping grab handle as seen from the side showing the position of the internal components in the retracted (or lowered) position.

FIG. 36 is a partial section of another embodiment comprising a telescoping grab handle as seen from the top, showing the position of the internal components in the retracted (or lowered) position.

FIG. 41 is a partial section of another embodiment comprising a telescoping grab handle as seen from the side showing the position of the internal components in the extended (or raised) position.

FIG. 42 is a partial section of another embodiment comprising a telescoping grab handle as seen from the top, showing the position of the internal components in the extended (or raised) position.

FIG. 43 is an enlarged view of another embodiment comprising a telescoping grab handle as seen from the side showing the position of the internal components in the extended (or raised) position.

FIG. 44 is a partial section of another embodiment comprising a telescoping grab handle as seen from the side showing the position of the internal components in the retracted (or lowered) position.

FIG. 45 is a partial section of another embodiment comprising a telescoping grab handle as seen from the top, showing the position of the internal components in the retracted (or lowered) position.

Figure 1:
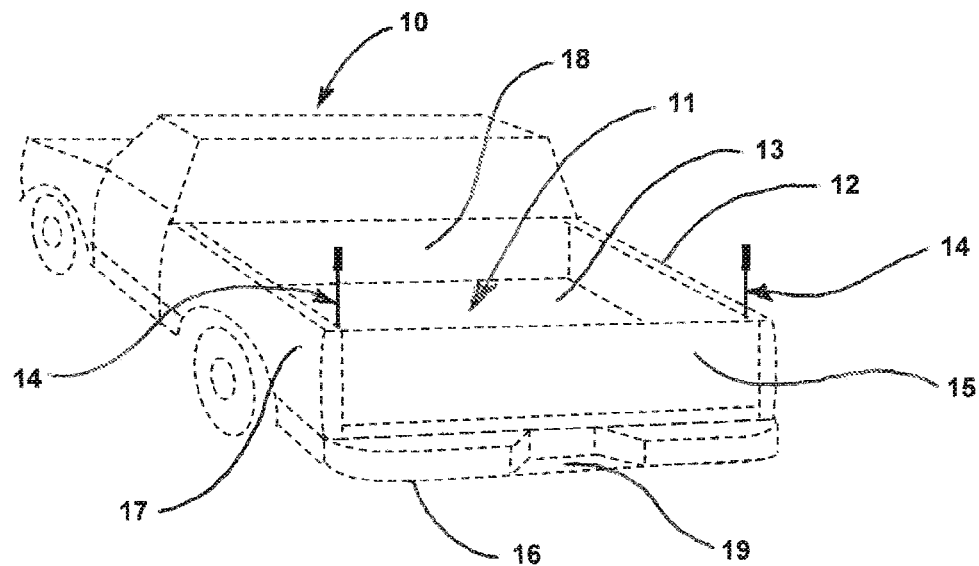
FIG. 1 is a perspective view of a pickup truck as seen from the rear with the tailgate closed showing two embodiments comprising the telescoping grab handle in the extended position as mounted near the rear corners of the cargo box, adjacent the tailgate.

REFERENCE NUMERALS 10 pickup truck
11 cargo box (or cargo bed)
12 right side wall of cargo box
13 floor of cargo box
14 telescoping grab handle
15 tailgate
16 rear bumper
17 left side wall of cargo box
18 front wall of cargo box
19 license plate cavity
20 tire
21 round bar (or round tube)
22 handle bar grip
23 square tube
24 retaining ring
25 limit plate
26 restraining notch
27 lower bevel
28 upper bevel
29 lock pin
30 mounting bracket
31 fastener
32 hole for fastener
33 cargo anchor
34 hinge point for pivoting cargo cage
35 triangular tube
114 embodiment comprising telescoping grab handle
121 bar or tube
122 handle bar grip
123 elongated angle
124 fastener
125 hole for fastener
126 lock hook
127 retaining bar 128 elongated channel
129 slot in elongated channel
130 embodiment comprising telescoping grab handle
214 embodiment comprising telescoping grab handle
221 bar or tube
222 handle bar grip
223 elongated tube
224 fastener
225 fastener
226 lock hook
227 retaining plate
228 embodiment comprising telescoping grab handle
314 embodiment comprising telescoping grab handle
321 bar or tube
322 handle bar grip
323 elongated tube
324 fastener
325 fastener
326 lock hook
327 retaining plate
328 embodiment comprising telescoping grab handle
329 hole in bar or tube

DETAILED DESCRIPTION OF THE PREFERRED EMBODIMENT

Figure 2:
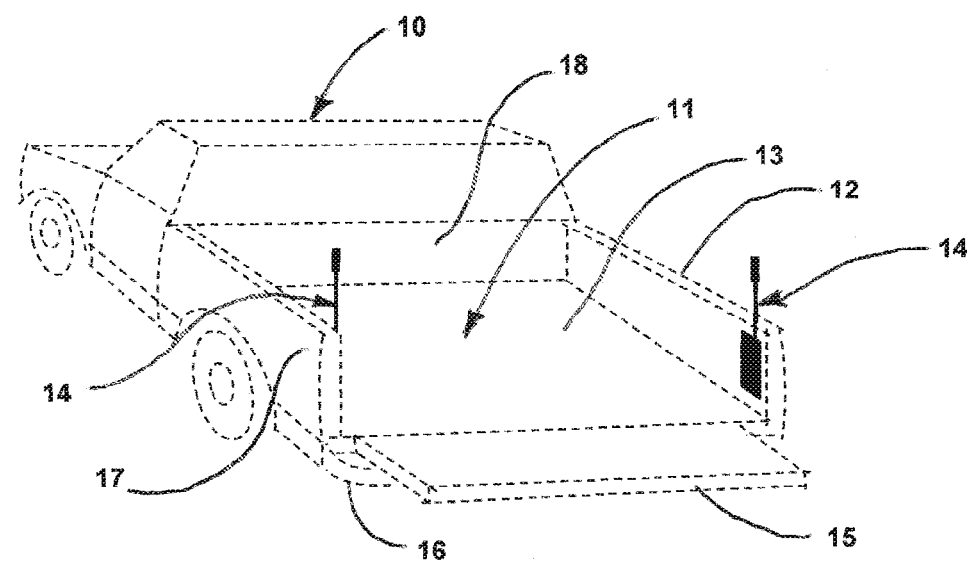
FIG. 2 is a perspective view of a pickup truck as seen from the rear with the tailgate open showing two embodiments comprising the telescoping grab handle in the extended position as mounted near the rear corners of the cargo box, adjacent the tailgate.

FIG. 1 is a perspective view of a typical pickup truck 10 as seen from the rear. Pickup truck 10 is typically manufactured with a cargo box 11 (or cargo bed as it is sometimes called) which comprises the rear portion of pickup truck 10. Cargo box 11 is generally comprised of a floor 13 bounded by a front wall 18, a right side wall 12, a left side wall 17 and an operable tailgate 15 in the rear. Tailgate 15 is pivotally attached at the bottom to floor 13. Tailgate 15 may be opened to a horizontal position as shown in FIG. 2 in order to load or unload cargo or closed to a vertical position as shown in FIG. 1 in order to retain cargo within cargo box 11. In some cases tailgate 15 may be removed in order to load or unload heavy cargo with a forklift.

When tailgate 15 is closed (in the vertical position) as shown in FIG. 1, access into cargo box 11 is typically accomplished by first grabbing the top of tailgate 15 to provide stability and then stepping into license plate cavity 19 located in the middle of rear bumper 16 and thence stepping over tailgate 15 into cargo box 11.

When tailgate 15 has been opened (in the horizontal position) as shown in FIG. 2 to load or unload cargo, most of bumper 16 and all of license plate cavity 19 is obstructed by tailgate 15. Consequently, in order to enter cargo box 11 personnel typically attempt to get a grip on right side wall 12 or left side wall 17 near the rear corners of cargo box 11 and step onto the exposed end of bumper 16 and thence onto tailgate 15. Stepping down off tailgate 15 near the rear corners of cargo box 11 is awkward and hazardous because left side wall 12 or right side wall 17 are not high enough above tailgate 15 to provide suitable stability.

In order to provide assistance to personnel when entering or exiting cargo box 11 when the tailgate 15 is open (or in the horizontal position), two embodiments which comprise telescoping grab handle 14 are shown in the extended position in FIG. 1. One telescoping grab handle 14 is shown at the left rear corner of cargo box 11, adjacent tailgate 15 and one telescoping grab handle 14 is shown at the right rear corner of cargo box 11, adjacent tailgate 15. Only one telescoping grab handle 14 is actually necessary to provide assistance to personnel when entering or exiting cargo box 11. However for convenience, two telescoping grab handles 14 may be placed as shown in FIG. 1 and FIG. 2 to provide assistance when entering or exiting cargo box 11 from the left side or the right side of pickup truck 10.

Figure 3:
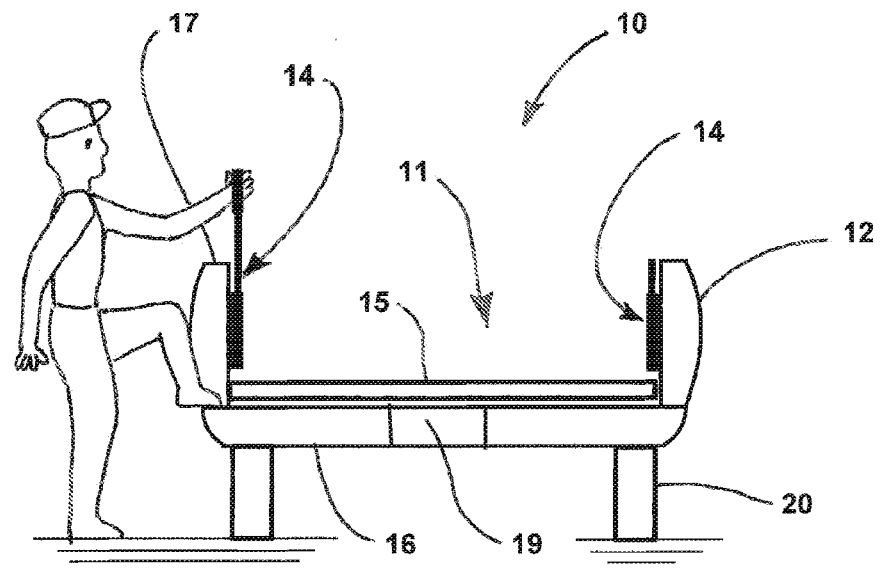
FIG. 3 is an elevation of a pickup truck as seen from the rear showing how personnel would utilize the telescoping grab handle when stepping up into the cargo box.

FIG. 3 is an elevation of pickup 10 as seen from the rear with the tailgate open (or in the horizontal position). One telescoping grab handle 14 is shown in the extended position as mounted on left side wall 17 of cargo box 11. Another telescoping grab handle 14 is shown in the retracted position as mounted on right sidewall 12 of cargo box 11. The person depicted on the left side of cargo box 11 shows how telescoping grab handle 14 would be utilized in order to provide assistance and enhanced stability when stepping up onto the exposed end of bumper 16 and thence onto tailgate 15. Note that there are no obstructions on tailgate 15 to interfere with the loading or unloading of cargo.

Figure 4:
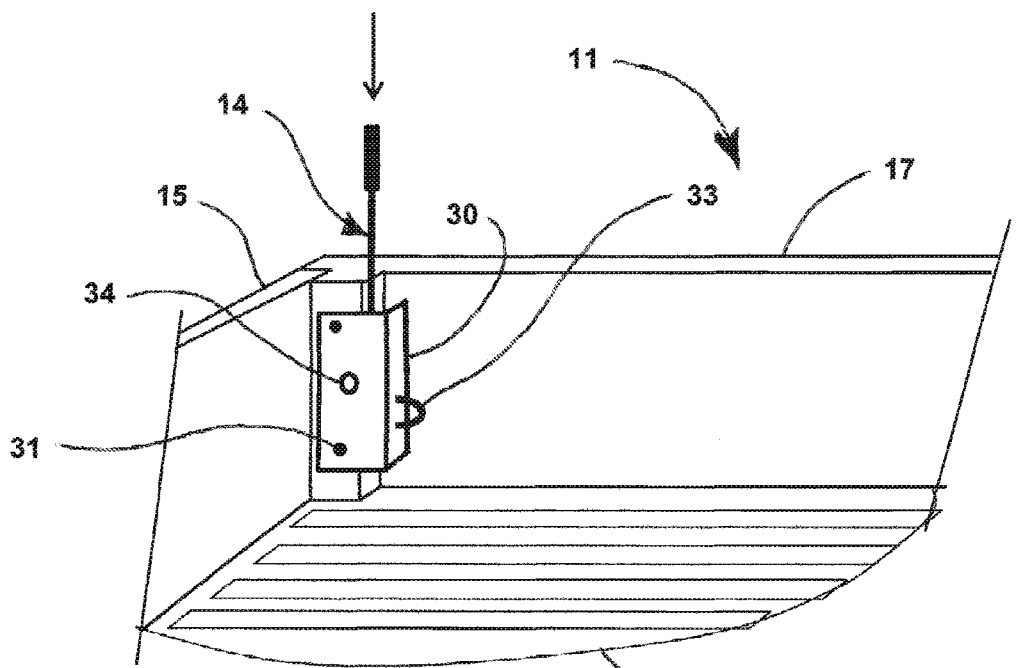
FIG. 4 is an interior perspective of the cargo box showing an exterior view of the embodiment comprising the telescoping grab handle as mounted on the left side wall of the cargo box, adjacent the tailgate.

FIG. 4 is an interior perspective view of cargo box 11 showing how telescoping grab handle 14 would appear in the extended position if mounted on left side wall 17 adjacent tailgate 15. The arrow above telescoping grab handle 14 shows the direction of travel if grab handle 14 were to be retracted. Mounting bracket 30 is configured to fit on the interior surface of left side wall 17 of cargo box 11 and is oriented with the longest dimension in the vertical direction. Mounting bracket 30 supports the internal components of telescoping grab handle 14 and can easily be secured to left side wall 17 with a plurality of fasteners 31 such as bolts, screws or rivets. Mounting bracket 30 also serves to cover the internal components of telescoping grab handle 14 from exterior view and prevents cargo from interfering with the telescoping action of telescoping grab handle 14. Optional cargo anchor 33 is shown in FIG. 4 and could be secured to mounting bracket 30 by welding or other suitable means. Mounting bracket 30 might also be utilized as a suitable mounting device for a cargo net, extendable cargo cage, cargo rack or other auto accessories know in the art. Hinge point 34 is an aperture provided to accommodate a pivoting cargo cage or bed extender.

Although FIG. 4 shows telescoping grab handle 14 as being installed as an aftermarket accessory, it is entirely possible that the internal components of telescoping grab handle 14 could be incorporated directly within left side wall 17 or directly within right side wall 12 by the auto manufacturer without mounting bracket 30.

FIG. 5 is a detailed elevation or side view of telescoping grab handle 14 showing the internal components as seen in the extended position. In order to reduce costs and avoid manufacturing problems, the preferred material for the components of telescoping grab handle 14 would be mild steel, but other alloys, other metals or other materials such as fiber reinforced plastic could be utilized. Fixed components would most likely be welded together, but mechanical fasteners or even adhesives might be utilized.

The only operable or moving part of telescoping grab handle 14 is round bar or round tube 21 which is sized so that it may rotate and slide within square tube 23 as shown in FIG. 6. The axis of square tube 23 is oriented vertically and would be welded to the top corner of mounting bracket 30 as shown in FIG. 5. Mounting bracket 30 would preferably be manufactured from steel sheet and would generally take the form of an elongated angle with one short leg and one long leg as shown in FIG. 6. However the size and configuration of mounting bracket 30 may vary depending on the size and configuration of left side wall 17 or right side wall 12 of cargo box 11 found on various pickup trucks 10. Mounting bracket 30 shown in FIG. 5 and FIG. 8 is actually manufactured to fit on left side wall 17 of cargo box 11. However, if a mounting bracket 30 is required for the right side wall 12 of cargo box 11, it can easily be made in similar fashion but "opposite hand". Mounting bracket 30 would include a plurality of holes 32 for fasteners as shown in FIG. 5 and FIG. 8 to be utilized for attachment to left side wall 17.

In addition, mounting bracket 30 may be fitted with an optional cargo anchor 33 as shown in FIG. 5 and FIG. 8. Cargo anchor 33 would preferably be a curved steel bar and would be welded to mounting bracket 30 at a location convenient to attach hooks, ropes or straps utilized to secure cargo. However, other suitable shapes and other means of attachment know in the art may be utilized for cargo anchor 33.

Mounting bracket 30 may also include an attachment or hinge point 34 for a pivoting cargo cage (sometimes called a bed extender).

Limit plate 25 is oriented horizontally and would be welded to mounting bracket 30 near the bottom corner as shown in FIG. 5 and FIG. 8. Limit plate 25 prevents round bar or round tube 21 from striking the floor of cargo box 13 when telescoping grab handle 14 is in the retracted position.

Retaining ring 24 is welded to the lower end of round bar or round tube 21 as shown in FIG. 5 and FIG. 8. The diameter of retaining ring 24 is sized large enough to prevent passage thru square tube 23, thus preventing removal of round bar or round tube 21 from telescoping grab handle 14.

Handle bar grip 22 may be placed on the top of round bar or round tube 21 to improve grip and appearance as shown in FIG. 5 and FIG. 8.

A small bar herein called lock pin 29 is placed thru round bar or round tube 21 and protrudes on both sides as shown in FIG. 5 and FIG. 8. The axis of lock pin 29 is perpendicular to the axis of round bar or round tube 21. Lock pin 29 would preferably be manufactured from hardened steel alloy to improve durability and would be tack welded in place to insure it would remain permanently fixed into round bar or round tube 21. Lock pin 29 is sized so that it will fit diagonally within square tube 23 as shown in FIG. 9. Lock pin 29 supports round bar or round tube 21 in the raised or extended position when oriented as shown in FIG. 6. A plurality of restraining notches 26 are placed in the top of square tube 23 as shown in FIG. 6 in order to prevent inadvertent rotation of round bar or round tube 21 while in the extended position. A plurality of upper bevels 28 as shown in FIG. 7 are also provided on top of square tube 23 in order to guide lock pin 29 into restraining notch 26. Corresponding lower bevels 27 are also shown and provide a manner of rotating round bar or round tube 21 when it is lifted so as to guide lock pin 29 to the open corner of square tube 23 to allow the pin to pass up to the top of square tube 23 where it may then be lowered into its locked position as shown in FIG. 7. As long as lock pin 29 is resting in restraining notch 26 as shown in FIG. 7, telescoping grab handle 14 will safely remain in the extended position.

In order to retract telescoping grab handle 14, one merely lifts round bar or round tube 21 enough to raise lock pin 29 out of restraining notch 26 to rotate round bar or round tube 21 until lock pin 29 is oriented diagonally across square tube 23 as shown in FIG. 9, thus allowing round bar or round tube 21 to slide down thru square tube 23 as shown in FIG. 8.

Reference is next made to FIG. 10 which is a partial cross section of the embodiment comprising the telescoping grab handle when viewed from the side showing the absence of the lock pin in the retracted position. The plurality of restraining notches 26 are shown in the top of square tube 23 as shown in FIG. 7 but without the positioning of the guide lock pin 29. In this view, round bar or round tube 21 is in a refracted position as shown in FIG. 8. The plurality of upper bevels 28 are shown in FIG. 10 and are, once again, provided on top of square tube 23 in order to guide lock pin 29 into restraining notch 26.

FIG. 11 is a detailed elevation or side view of telescoping grab handle 14 showing an alternate embodiment of internal components as seen in the extended position. Note that triangular tube 35 shown in FIG. 11 has replaced square tube 23 as previously shown in FIG. 5. All other components shown in FIG. 11 are the same as shown in FIG. 5 except for lock pin 29 which protrudes from only one side of round bar or round tube 21.

FIG. 12 is a partial cross section of an alternate embodiment of telescoping grab handle 14 when viewed from the top showing the orientation of lock pin 29 in the extended position. Note that triangular tube 35 shown in FIG. 12 has replaced square tube 23 shown in FIG. 6. Other components in FIG. 12 are the same as shown in FIG. 6 except for lock pin 29 which protrudes from only one side of round bar or round tube 21.

FIG. 13 is a partial cross section of an alternate embodiment of telescoping grab handle 14 when viewed from the side showing lock pin 29 resting in a restraining notch 26. Note that triangular tube 35 shown in FIG. 13 has replaced square tube 23 shown in FIG. 7. All other components shown in FIG. 13 are the same as shown in FIG. 7.

FIG. 14 is a detailed elevation or side view of telescoping grab handle 14 showing an alternate embodiment of internal components as seen in the retracted position. Note that triangular tube 35 shown in FIG. 14 has replaced square tube 23 as previously shown in FIG. 8. All other components shown in FIG. 14 are the same as shown in FIG. 8 except for lock pin 29 which protrudes from only one side of round bar or round tube 21.

FIG. 15 is a partial cross section of an alternate embodiment of telescoping grab handle 14 when viewed from the top showing the orientation of lock pin 29 in the retracted position. Note that triangular tube 35 shown in FIG. 15 has replaced square tube 23 shown in FIG. 9. Other components in FIG. 15 are the same as shown in FIG. 9 except for lock pin 29 which protrudes from only one side of round bar or round tube 21.

FIG. 16 is a partial cross section of an alternate embodiment of telescoping grab handle 14 when viewed from the side showing the absence of lock pin 29 in the retracted position. Note that triangular tube 35 shown in FIG. 16 has replaced square tube 23 shown in FIG. 10. All other components shown in FIG. 16 are the same as shown in FIG. 10.

Figure 17:
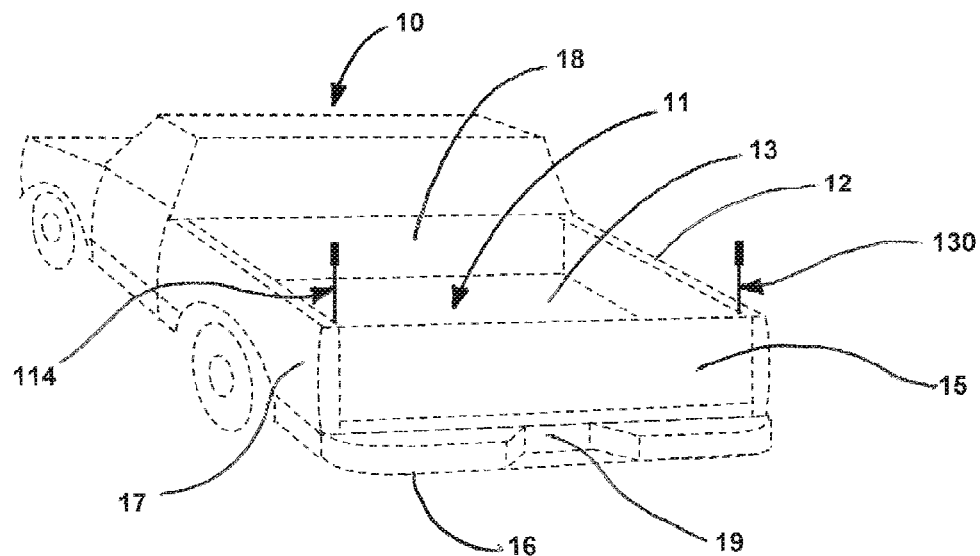
FIG. 17 is a perspective view of a pickup truck as seen from the rear with the tailgate closed (or up), showing two other embodiments comprising a telescoping grab handle in the extended (or raised) position as mounted near the rear corners of the cargo box, adjacent the tailgate.
Figure 18:
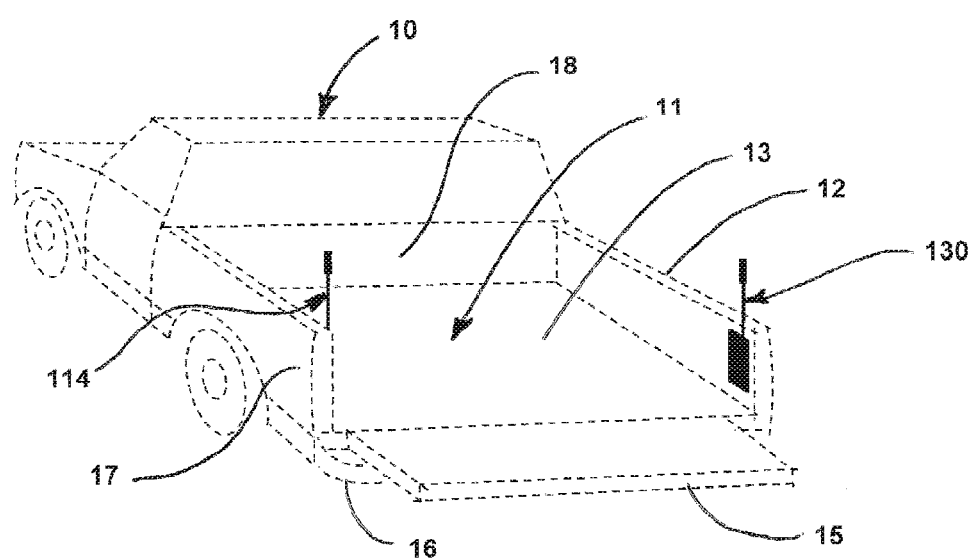
FIG. 18 is a perspective view of a pickup truck as seen from the rear with the tailgate open (or down), showing two other embodiments comprising a telescoping grab handle in the extended (or raised) position as mounted near the rear corners of the cargo box, adjacent the tailgate.
Figure 19:
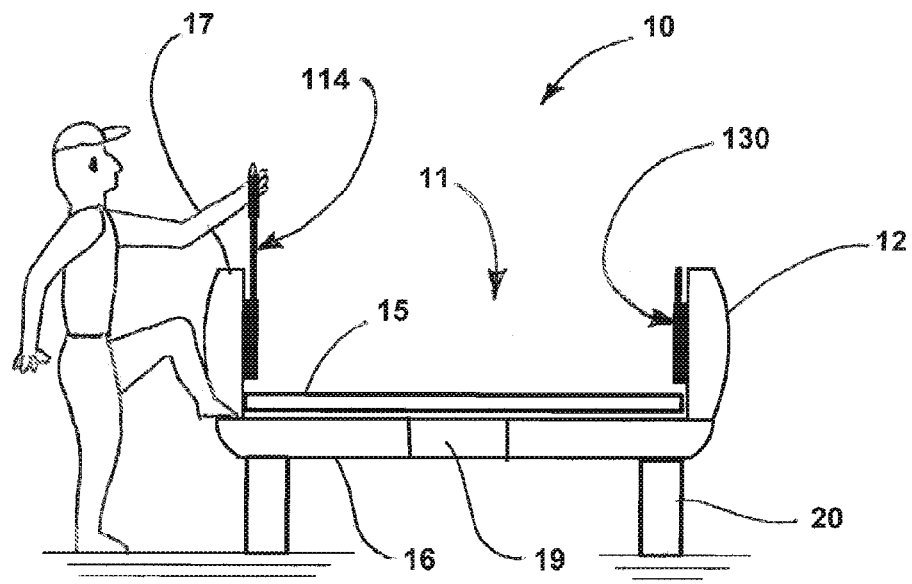
FIG. 19 is an elevation of a pickup truck as seen from the rear showing how personnel would utilize another embodiment of the telescoping grab handle when stepping up into the cargo box.
Figure 20:
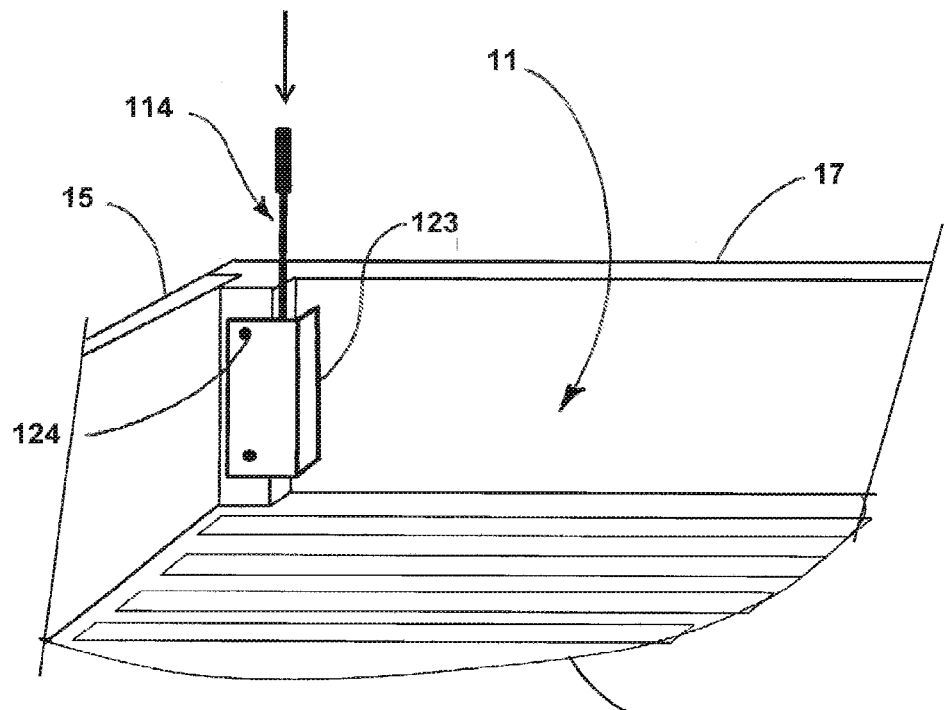
FIG. 20 is an interior view of the cargo box showing another embodiment comprising a telescoping grab handle in the extended (or raised) position as mounted on the left side wall of the cargo box, adjacent the tailgate.

In another embodiment, telescoping grab handle 114 (or telescoping grab handle 130) as shown in FIG. 17, FIG. 18 or FIG. 19 is comprised of bar or tube 121 which is sized so that it will slide within elongated channel 128 as shown in FIG. 21. Elongated channel 128 is attached to the interior face of an elongated angle 123 as shown in FIG. 22 in such a manner as to form an elongated tube. When elongated angle 123 is oriented vertically it can be mounted on the interior face of the side wall 17 of cargo box 11, adjacent tailgate 15, as shown in FIG. 20. Thus, elongated channel 128 and elongated angle 123 form an elongated tube which restrains bar or tube 121 in the vertical orientation, yet also allows bar or tube 121 to slide up or down.

It should be noted that elongated angle 123 protects the internal components of telescoping grab handle 114 and may also serve as a mounting bracket for a cargo anchor, cargo cage or other auto accessories know in the art.

A small protrusion, herein called "lock hook" 126, is attached to the lower end of bar or tube 121 as shown in FIG. 21 in such a manner that it will retain bar or tube 121 in the extended (or raised) position when lock hook 126 is resting on top of elongated channel 128 as shown in FIG. 23, thus assuring that telescoping grab handle 114 (or telescoping grab handle 130) will remain in the extended (or raised) position while in use.

To retract telescoping grab handle 114 (or telescoping grab handle 130) one merely lifts and tilts bar or tube 121 away from elongated channel 128 enough to allow lock hook 126 to slide down thru the elongated tube formed by elongated channel 128 and elongated angle 123, as shown in FIG. 24, FIG. 25, FIG. 26, FIG. 27 & FIG. 28.

Figure 27:
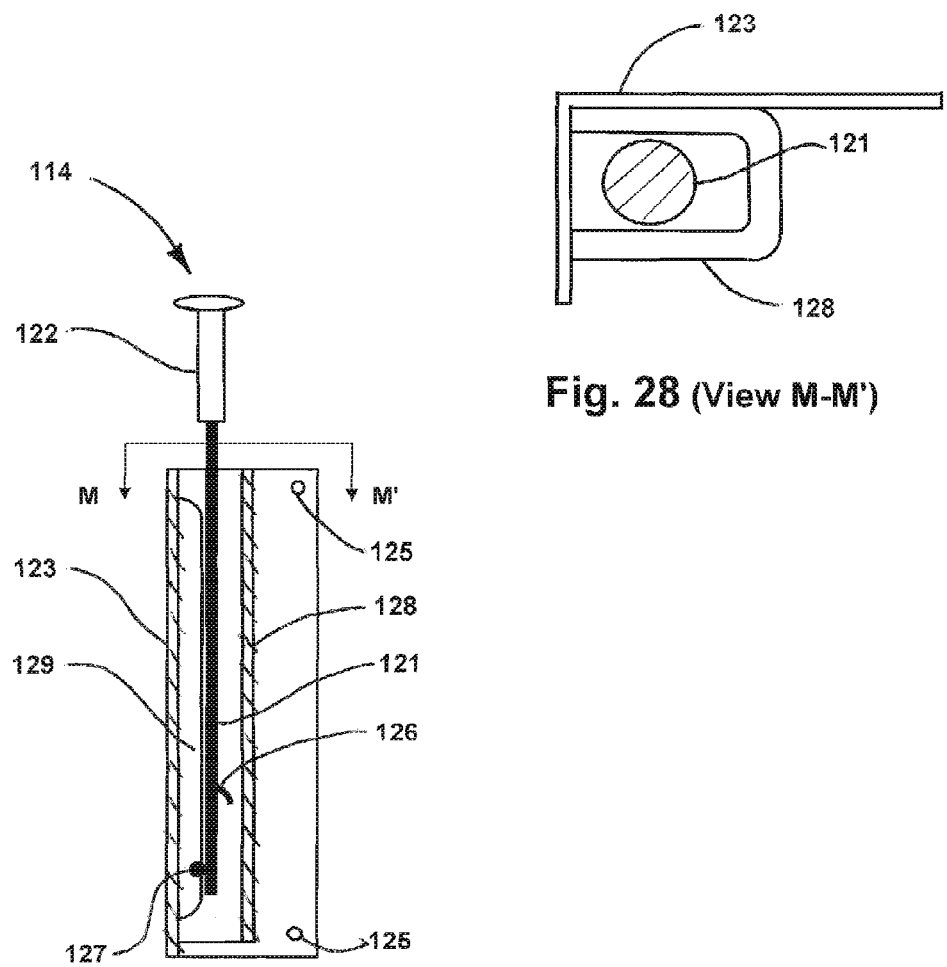
FIG. 27 is a partial section of another embodiment comprising a telescoping grab handle as seen from the side showing the position of the internal components in the retracted (or lowered) position.

A small bar or tube herein called "retaining bar" 127 is attached near the bottom of bar or tube 121 as shown in FIG. 21, FIG. 24 and FIG. 27. Retaining bar 127 is sized so that it will slide up and down within groove 129, which is formed by the configuration of elongated channel 128 and elongated angle 123, as shown in FIG. 21, FIG. 24 and FIG. 27. Thus retaining bar 127 limits the extension of telescoping grab handle 114 (or telescoping grab handle 130) and prevents personnel from removing bar or tube 121 from telescoping grab handle 114 (or telescoping grab handle 130).

Plastic handle bar grip 122 may be placed on top of bar or tube 121 to improve grip and appearance as shown in FIG. 21, FIG. 24 and FIG. 27.

Figure 29:
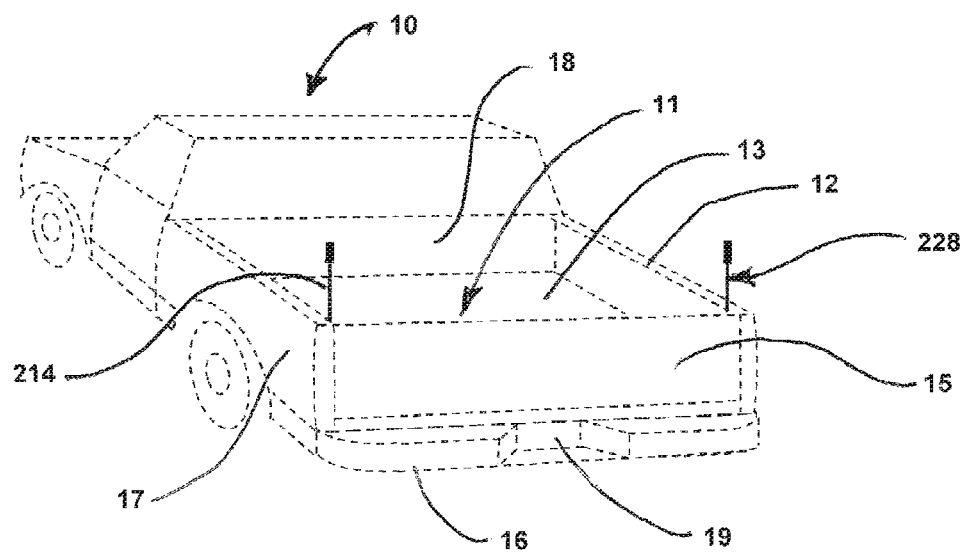
FIG. 29 is a perspective view of a pickup truck as seen from the rear with the tailgate closed (or up) showing two other embodiments comprising a telescoping grab handle in the extended (or raised) position as mounted in the rear corners of the cargo box, adjacent the tailgate.
Figure 30:
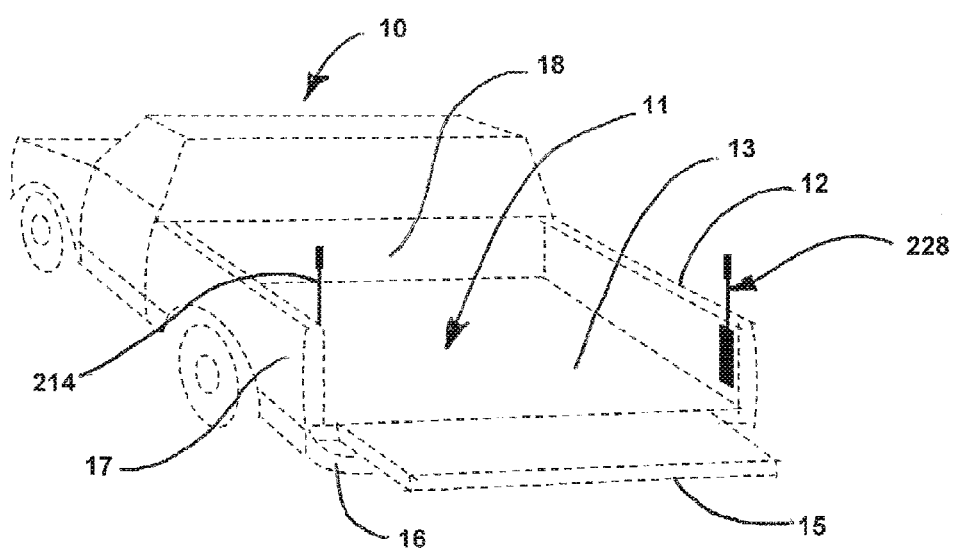
FIG. 30 is a perspective view of a pickup truck as seen from the rear with the tailgate open (or down), showing two other embodiments comprising a telescoping grab handle in the extended (or raised) position as mounted on the side walls of the cargo box, adjacent the tailgate.
Figure 31:
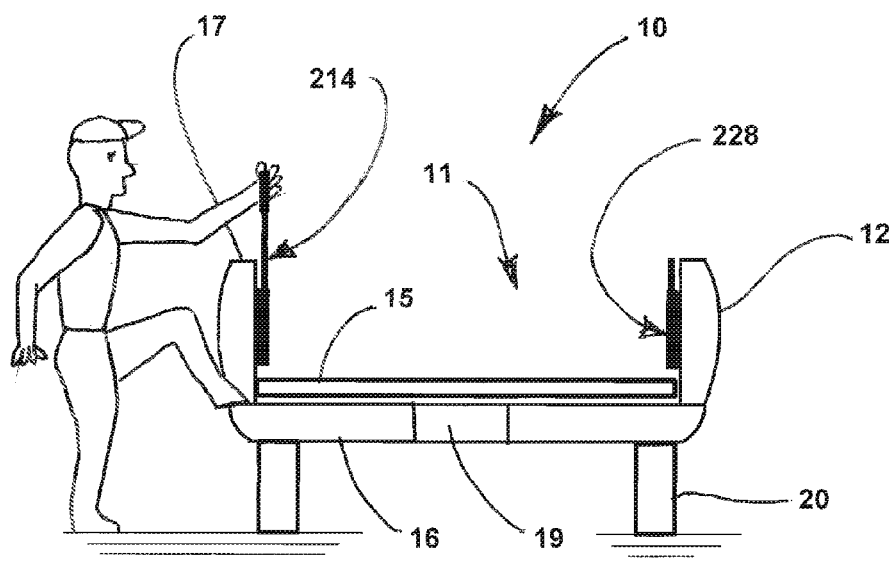
FIG. 31 is an elevation of a pickup truck as seen from the rear showing how personnel would utilize another embodiment of the telescoping grab handle when stepping up into the cargo box.

In another embodiment, telescoping grab handle 214 (or telescoping grab handle 228) as shown in FIG. 29, FIG. 30 & FIG. 31 is comprised of bar or tube 221 as shown in FIG. 33 & FIG. 35 which is sized so that it will slide within elongated tube 223 as shown in FIG. 34 & FIG. 36.

Figure 32:
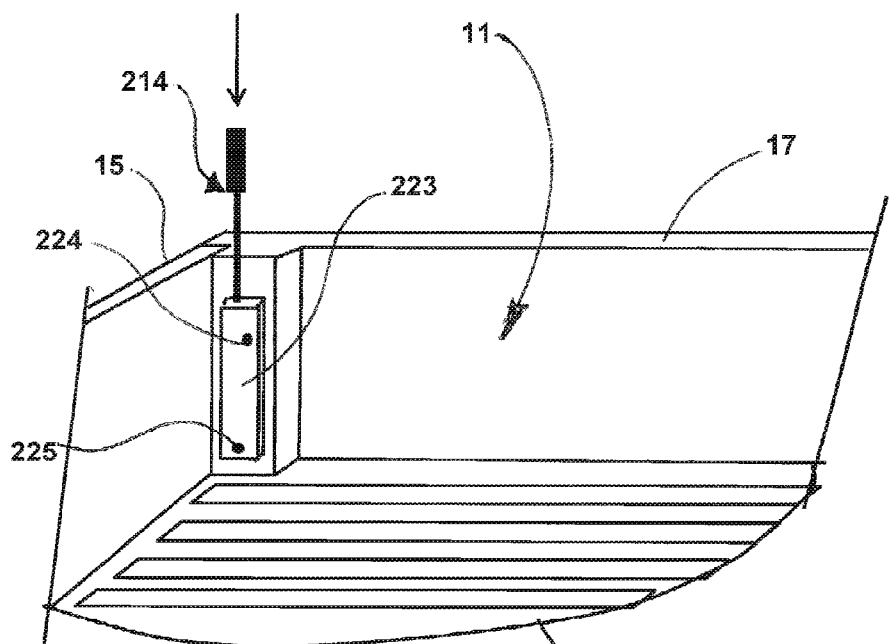
FIG. 32 is an interior view of the cargo box showing another embodiment comprising a telescoping grab handle in the extended (or raised) position as mounted on the left side wall of the cargo box, adjacent the tailgate.

When elongated tube 223 is oriented vertically, it can be mounted within cargo box 11 on the interior face of side wall 17 with a polarity of fasteners 224 and 225, as shown in FIG. 32. Thus, elongated tube 223 serves as a mounting bracket which can be placed on the left side or right side of cargo box 11 without modification and restrains bar or tube 221 in the vertical orientation, yet also allows bar or tube 221 to slide up or down. It should be noted that elongated tube 223 protects the internal components of telescoping grab handle 214 or 228 and may also serve as a mounting bracket for a cargo anchor, cargo cage or other auto accessories known in the art.

A small protrusion, herein called "lock hook" 226, is attached to the lower end of bar or tube 221 in such a manner that it will retain bar or tube 221 in the extended (or raised) position when "lock hook" 226 is resting atop the side wall of elongated tube 223 as shown in FIG. 33 & FIG. 34, thus assuring that telescoping grab handle 214 (or telescoping grab handle 228) will remain in the extended (or raised) position while in use.

To retract telescoping grab handle 214 (or telescoping grab handle 228) one merely lifts and tilts bar or tube 221 away from the side wall of elongated tube 223 enough to allow lock hook 226 to slide down thru elongated tube 223 as shown in FIG. 35 & FIG. 36.

A small plate (or bar or tube) herein called "retaining plate" 227 is attached to the bottom of bar or tube 221 as shown in FIG. 33 and FIG. 35. The size of retaining plate 227 is slightly smaller than the interior dimensions of tube 223 as shown in FIG. 34 and FIG. 36, thus allowing bar or tube 221 to slide up and down within elongated tube 223. Retaining plate 227 limits the travel of bar or tube 221 when it strikes fastener 224 as shown in FIG. 33. Fastener 225 also limits the travel of bar or tube 221 as shown in FIG. 35, thus, fasteners 224 and 225 assure that bar or tube 221 cannot be removed from telescoping grab handle 214 (or telescoping grab handle 228). Fasteners 224 and 225 are also used to secure elongated tube 223 to side wall 17 of cargo bed 11 as shown in FIG. 32 and thus perform a dual function. Although only two fasteners have been shown in this disclosure, three, four or more fasteners may be utilized to perform the dual function described above.

Handle bar grip 222 may be placed on top of bar or tube 221 to improve grip and appearance as shown in FIG. 33 and FIG. 35.

Figure 37:
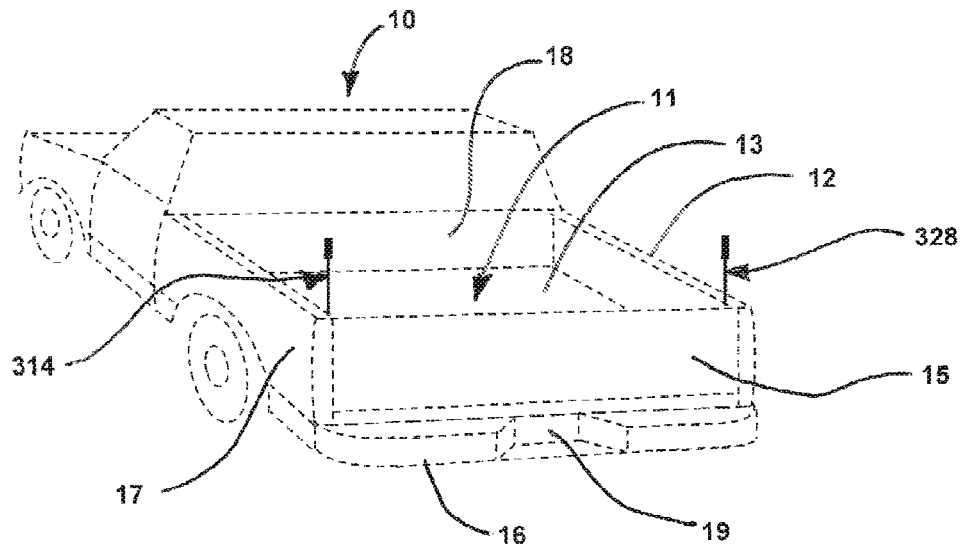
FIG. 37 is a perspective view of a pickup truck as seen from the rear with the tailgate closed (or up) showing two other embodiments comprising a telescoping grab handle in the extended (or raised) position as mounted in the rear corners of the cargo box, adjacent the tailgate.
Figure 38:
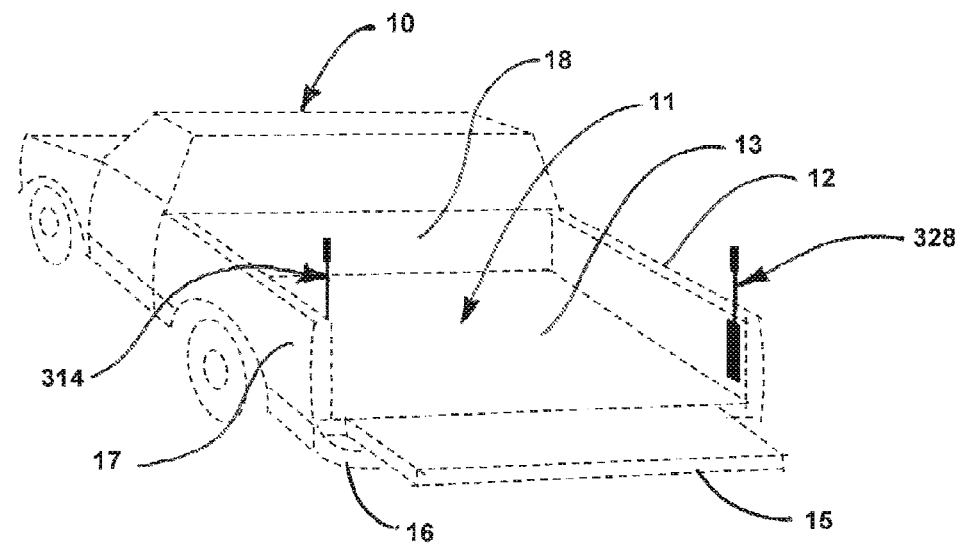
FIG. 38 is a perspective view of a pickup truck as seen from the rear with the tailgate open (or down), showing two other embodiments comprising a telescoping grab handle in the extended (or raised) position as mounted on the side walls of the cargo box, adjacent the tailgate.
Figure 39:
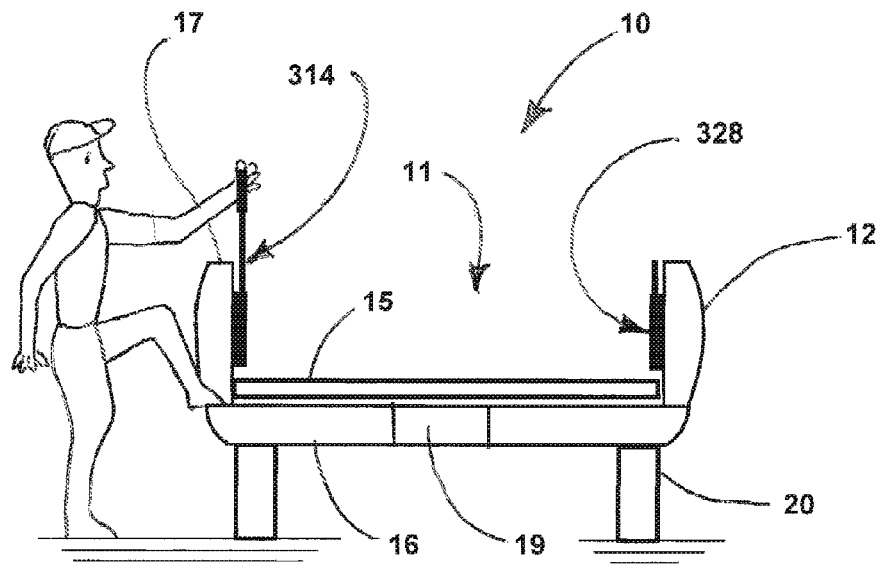
FIG. 39 is an elevation of a pickup truck as seen from the rear showing how personnel would utilize another embodiment of the telescoping grab handle when stepping up into the cargo box.

In another embodiment, telescoping grab handle 314 (or telescoping grab handle 328) as shown in FIG. 37, FIG. 38 & FIG. 39 is comprised of bar or tube 321 as shown in FIG. 41 & FIG. 44 which is sized so that it will slide within elongated tube 323 as shown in FIG. 42 & FIG. 45.

Figure 40:
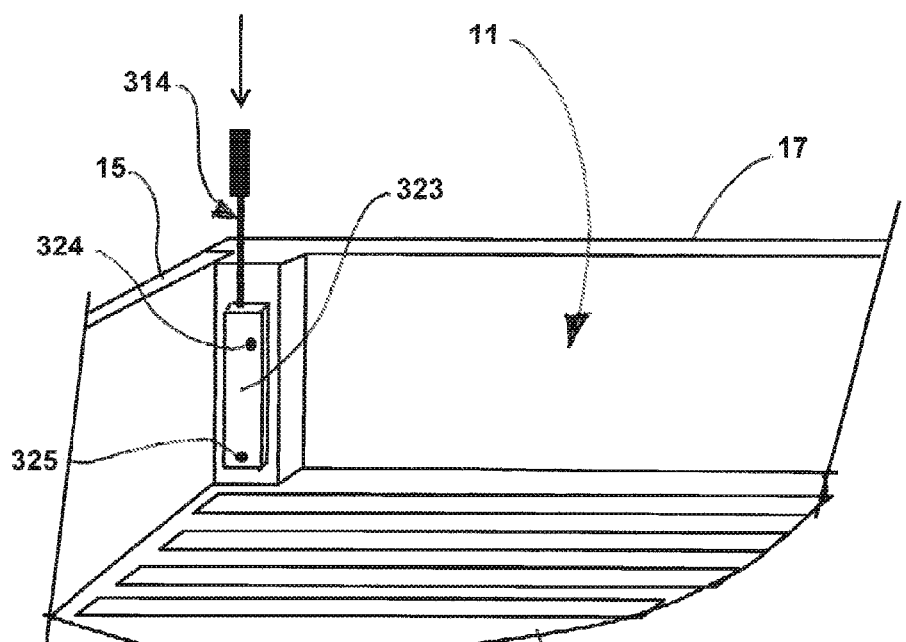
FIG. 40 is an interior view of the cargo box showing another embodiment comprising a telescoping grab handle in the extended (or raised) position as mounted on the left side wall of the cargo box, adjacent the tailgate.

When elongated tube 323 is oriented vertically, it can be mounted within cargo box 11 on the interior face of side wall 17 with a polarity of fasteners 324 and 325, as shown in FIG. 40. Thus, elongated tube 323 serves as a mounting bracket which can be placed on the left side or right side of cargo box 11 without modification and restrains bar or tube 321 in the vertical orientation, yet also allows bar or tube 321 to slide up or down. It should be noted that elongated tube 323 protects the internal components of telescoping grab handle 314 or 328 and may also serve as a mounting bracket for a cargo anchor, cargo cage or other auto accessories known in the art.

A small protrusion, herein called "lock hook" 326, is attached to the upper end of tube 323 as shown in FIG. 41 & FIG. 44. Lock hook 326 is sized so that it will fit within hole 329 in bar or tube 321 as shown in FIG. 43 & FIG. 42 in such a manner that it will retain bar or tube 321 in the extended (or raised) position when bar or tube 321 is resting on "lock hook" 326, thus assuring that telescoping grab handle 314 (or telescoping grab handle 328) will remain in the extended (or raised) position while in use.

To retract telescoping grab handle 314 (or telescoping grab handle 328) one merely lifts and tilts bar or tube 321 away from lock hook 326 enough to allow bar or tube 321 to slide down thru elongated tube 323 as shown in FIG. 44 & FIG. 45.

A small plate (or bar or tube) herein called "retaining plate" 327 is attached to the bottom of bar or tube 321 as shown in FIG. 41, 43 and FIG. 44. The size of retaining plate 327 is slightly smaller than the interior dimensions of tube 323 as shown in FIG. 42 and FIG. 45, thus allowing bar or tube 321 to slide up and down within tube 323. Retaining plate 327 limits the travel of bar or tube 321 when it strikes fastener 324 as shown in FIG. 41. Fastener 325 also limits the travel of bar or tube 321 as shown in FIG. 44, thus, fasteners 324 and 325 assure that bar or tube 321 cannot be removed from telescoping grab handle 314 (or telescoping grab handle 328). Fasteners 324 and 325 are also used to secure elongated tube 323 to side wall 17 of cargo bed 11 as shown in FIG. 40 and thus perform a dual function. Although only two fasteners have been shown in this disclosure, three, four or more fasteners may be utilized to perform the dual function described above.

Handle bar grip 322 may be placed on top of bar or tube 321 to improve grip and appearance as shown in FIG. 42 and FIG. 44.

Consideration must be given to the fact that although this invention has been described and disclosed in relation to certain preferred embodiments, equivalent modifications and alterations may become apparent to persons of ordinary skill in this art without deviating from the inventive concepts set forth.

Although the present invention has been described in terms of the foregoing preferred and alternate embodiments, this description has been provided by way of explanation only, and is not intended to be construed as a limitation of the invention. Those skilled in the art will recognize modifications in the present invention that might accommodate specific pickup trucks and specific cargo bed configurations. Such modifications as to structure, method of operation, and even the specific arrangement of components, where such modifications are coincidental to the specific truck design or cargo bed structure being utilized, do not necessarily depart from the spirit and scope of the invention. Those skilled in the art will recognize that the structures of the present invention may be implemented by fitting the telescoping grab handle within the side wall of the cargo box or on the side wall surface of the cargo box. One of the key structural features is the telescoping member and lock pin action which requires only one moving part and may be achieved with a square tubular collar or a triangular tubular collar as described herein. In addition to supporting the internal components, the mounting bracket protects the internal components from interference with stowed or loaded cargo. The mounting bracket may also serve as a support for various auto accessories such as a cargo anchor, cargo rack or pivoting cargo cage.

I claim:

1. A grab handle device for providing assistance and enhanced stability to a person when entering or exiting a cargo box on a pickup truck, the grab handle device comprising:
   a mounting bracket positioned in association with a sidewall of the cargo box of the pickup truck, the mounting bracket comprising an upright tubular member, the tubular member having a top edge;
   a movable grab bar slidingly positioned within the tubular member of the mounting bracket, the grab bar oriented generally upright with respect to the sidewall of the cargo box, the grab bar comprising a first end extending above the top edge of the tubular member and a second end extending into the tubular member, the grab bar movable between a first position with the first end lowered and proximal to the top edge of the tubular member and a second position with the first end elevated and distal to the top edge of the tubular member, the movable grab bar further comprising a holding mechanism for securing the grab bar in the elevated second position with the first end of the grab bar extending above a top edge of the sidewall of the cargo box, the holding mechanism comprising a retention hook positioned on a side of the movable grab bar, the retention hook oriented to engage the top edge of the tubular member when the grab bar is in the second elevated position.

2. The grab handle device of claim 1 wherein the tubular member comprises a rectangular tube cross section, and wherein the grab bar further comprises an orientation member, the orientation member preventing rotation of the grab bar about a longitudinal axis thereof, thereby maintaining an orientation of the retention hook thereon and its engagement of the top edge of the tubular member.

3. The grab handle device of claim 2 further comprising at least one internal stop mechanism, the at least one internal stop mechanism limiting movement of the movable grab bar within the tubular member to prevent extension of the grab bar beyond the second position.

4. The grab handle device of claim 3 wherein the at least one internal stop mechanism comprises a cross member positioned through the tubular member to operate in concert with the orientation member of the grab bar to limit movement of the movable grab bar.

5. The grab handle device of claim 4 wherein the cross member of the at least one internal stop mechanism further serves to secure the tubular member of the mounting bracket to the sidewall of the cargo box of the pickup truck.

6. The grab handle device of claim 3 wherein the at least one internal stop mechanism comprises upper and lower stop mechanisms, the upper stop mechanism limiting movement of the movable grab bar within the tubular member to prevent extension of the grab bar beyond the second position, and the lower stop mechanism limiting movement of the movable grab bar within the tubular member to prevent lowering of the grab bar beyond the first position.

7. The grab handle device of claim 6 wherein the upper and lower stop mechanisms each comprises a cross member positioned through the tubular member to operate in concert with the orientation member of the grab bar to limit movement of the movable grab bar.

8. The grab handle device of claim 7 wherein the cross member of each of the upper and lower stop mechanisms further serves to secure the tubular member of the mounting bracket to the sidewall of the cargo box of the pickup truck.

9. The grab handle device of claim 1 wherein the mounting bracket is positioned within the structure of the sidewall of the cargo box of the pickup truck.

10. The grab handle device of claim 1 wherein the mounting bracket is positioned on an inside-the-bed surface of the sidewall of the cargo box of the pickup truck.

11. The grab handle device of claim 1 further comprising a handle bar grip positioned on the first end of the movable grab bar.

12. The grab handle device of claim 2 wherein the orientation member comprises a generally rectangular plate positioned on the second end of the movable grab bar, the rectangular plate slideable in connection with the grab bar within the tubular member.

13. The grab handle device of claim 2 wherein the orientation member comprises a cross member positioned on the second end of the movable grab bar and a corresponding track positioned within the tubular member, the cross member slidingly engaging the track and slideable in connection with the grab bar within the tubular member.

14. The grab handle device of claim 1 further comprising at least one mounting bolt for securing the mounting bracket to the sidewall of the cargo box.

15. The grab handle device of claim 1 wherein the upright tubular member comprises transverse axial symmetry such that the same orientation of the tubular member permits alternate attachment to a left hand section of the sidewall or a right hand section of the sidewall of the cargo box of the pickup truck.

16. A grab handle device for providing assistance and enhanced stability to a person when entering or exiting a cargo box on a pickup truck, the grab handle device comprising:
   a mounting bracket positioned in association with a sidewall of the cargo box of the pickup truck, the mounting bracket comprising an upright tubular member, the tubular member having a top edge; and
   a movable grab bar slidingly positioned within the tubular member of the mounting bracket, the grab bar oriented generally upright with respect to the sidewall of the cargo box, the grab bar comprising a first end extending above the top edge of the tubular member and a second end extending into the tubular member, the grab bar movable between a first position with the first end lowered and proximal to the top edge of the tubular member and a second position with the first end elevated and distal to the top edge of the tubular member, the movable grab bar further comprising a retention hook positioned on a side of the movable grab bar, the retention hook oriented to engage the top edge of the tubular member when the grab bar is in the second elevated position.

17. The grab handle device of claim 16 further comprising at least two mounting bolts for securing the mounting bracket to the sidewall of the cargo box.

18. The grab handle device of claim 17 wherein the at least two mounting bolts comprise an upper bolt and a lower bolt, each bolt traversing through the tubular member and wherein the grab handle device further comprises a limit plate positioned on the second end of the movable grab bar and oriented to contact the upper bolt to prevent movement of the grab bar above the second position and to contact the lower bolt to prevent movement of the grab bar below the first position.

* * * * *